(12) United States Patent
Latulipe et al.

(10) Patent No.: US 10,079,039 B2
(45) Date of Patent: *Sep. 18, 2018

(54) MULTI-MODAL COLLABORATIVE WEB-BASED VIDEO ANNOTATION SYSTEM

(71) Applicant: University of North Carolina at Charlotte, Charlotte, NC (US)

(72) Inventors: Celine Latulipe, Charlotte, NC (US); Vikash Singh, Charlotte, NC (US); David Wilson, Charlotte, NC (US); Sybil Huskey, Rock Hill, SC (US)

(73) Assignee: The University of North Carolina at Charlotte, Charlotte, NC (US)

( * ) Notice: Subject to any disclaimer, the term of this patent is extended or adjusted under 35 U.S.C. 154(b) by 396 days.

This patent is subject to a terminal disclaimer.

(21) Appl. No.: 15/144,976

(22) Filed: May 3, 2016

(65) Prior Publication Data

US 2016/0247535 A1    Aug. 25, 2016

Related U.S. Application Data

(63) Continuation of application No. 13/627,899, filed on Sep. 26, 2012, now Pat. No. 9,354,763.

(Continued)

(51) Int. Cl.
*G11B 27/00* (2006.01)
*G06F 17/24* (2006.01)
(Continued)

(52) U.S. Cl.
CPC .......... *G11B 27/002* (2013.01); *G06F 3/0482* (2013.01); *G06F 3/04842* (2013.01);
(Continued)

(58) Field of Classification Search
CPC ............... G06F 3/048–3/04886; G06F 17/3074–17/30855
See application file for complete search history.

(56) References Cited

U.S. PATENT DOCUMENTS 7,765,491 B1    7/2010  Cotterill
8,112,702 B2 *  2/2012  Badoiu ............... G06F 17/3082
                                                              715/230

(Continued)

FOREIGN PATENT DOCUMENTS

WO    2007109162 A2    9/2007

OTHER PUBLICATIONS

Information Disclosure Statement (IDS) Letter Regarding Common Patent Application(s), dated Sep. 8, 2016.

*Primary Examiner* — Renee D Chavez
*Assistant Examiner* — Patrick R Ramsey
(74) *Attorney, Agent, or Firm* — Tillman Wright, PLLC; James D. Wright; Jeremy C. Doerre

(57) ABSTRACT

A video annotation interface includes a video pane configured to display a video, a video timeline bar including a video play-head indicating a current point of the video which is being played, a segment timeline bar including initial and final handles configured to define a segment of the video for playing, and a plurality of color-coded comment markers displayed in connection with the video timeline bar. Each of the comment markers is associated with a frame or segment of the video and corresponds to one or more annotations for that frame or segment made by one of a plurality of users. Each of the users can make annotations and view annotations made by other users. The annotations can include annotations corresponding to a plurality of modalities, including text, drawing, video, and audio modalities.

12 Claims, 32 Drawing Sheets

Related U.S. Application Data

(60) Provisional application No. 61/539,147, filed on Sep. 26, 2011.

(51) Int. Cl.

| | | |
|---|---|---|
| *G06F 3/0484* | (2013.01) | |
| *G06F 3/0482* | (2013.01) | |
| *G11B 27/34* | (2006.01) | |
| *G11B 27/036* | (2006.01) | |
| *G11B 27/22* | (2006.01) | |
| *H04L 29/08* | (2006.01) | |
| *G06F 17/30* | (2006.01) | |
| *G06Q 10/10* | (2012.01) | |
| *G11B 27/10* | (2006.01) | |
| *H04N 21/4788* | (2011.01) | |
| *H04N 21/854* | (2011.01) | |
| *H04N 21/8547* | (2011.01) | |

(52) U.S. Cl.
CPC ........ *G06F 3/04847* (2013.01); *G06F 17/241* (2013.01); *G06F 17/3082* (2013.01); *G06Q 10/101* (2013.01); *G06Q 10/103* (2013.01); *G11B 27/036* (2013.01); *G11B 27/105* (2013.01); *G11B 27/22* (2013.01); *G11B 27/34* (2013.01); *H04L 67/02* (2013.01); *H04L 67/10* (2013.01); *H04N 21/4788* (2013.01); *H04N 21/854* (2013.01); *H04N 21/8547* (2013.01)

(56) References Cited

U.S. PATENT DOCUMENTS

| | | | |
|---|---|---|---|
| 8,392,821 B2 | 3/2013 | DeMarco et al. | |
| 8,724,960 B2 | 5/2014 | Iwase et al. | |
| 8,775,922 B2* | 7/2014 | Datar | G06F 17/30817 715/230 |
| 8,826,117 B1* | 9/2014 | Junee | G11B 27/034 715/230 |
| 2004/0047589 A1 | 3/2004 | Kim | |
| 2006/0098941 A1 | 5/2006 | Abe et al. | |
| 2006/0143560 A1* | 6/2006 | Gupta | G06F 17/241 715/202 |
| 2008/0095404 A1 | 4/2008 | Abercrombie et al. | |
| 2008/0313541 A1* | 12/2008 | Shafton | G06F 17/30817 715/725 |
| 2009/0132952 A1 | 5/2009 | Wong | |
| 2009/0187825 A1 | 7/2009 | Sandquist et al. | |
| 2009/0297118 A1 | 12/2009 | Fink et al. | |
| 2009/0327856 A1 | 12/2009 | Mouilleseaux et al. | |
| 2010/0199182 A1* | 8/2010 | Lanza | G06F 17/30817 715/723 |
| 2010/0251120 A1 | 9/2010 | Chelba | |
| 2011/0052144 A1 | 3/2011 | Abbas et al. | |
| 2011/0289401 A1 | 11/2011 | Fischer | |
| 2012/0047119 A1 | 2/2012 | Kandekar et al. | |
| 2012/0308196 A1 | 12/2012 | Bowman | |
| 2013/0132839 A1 | 5/2013 | Berry | |
| 2013/0145269 A1 | 6/2013 | Latulipe | |
| 2013/0174007 A1 | 7/2013 | DeMarco et al. | |

\* cited by examiner

Upload a New Video File | Write/See Journal Entry | Select/Change Video

Welcome, Jeremy | Log Out

1. Select a folder where you want to upload the file

Video Files
  user1

OR Create a new folder

2. You have selected folder:

3. Select a video file to upload:
   [Choose File] No file chosen

4. Add video description:

[Upload]

Upload a New Video File | Write/See Journal Entry | Select/Change Video

Write a private journal entry

Title

[Add Entry] [Clear]

user1's journal entries

Journal entry
September 24, 2012, 12:18 pm

Today was a good day test
September 24, 2012, 12:20 pm blah

Welcome, user1 | Log Out

*FIG. 14*

MULTI-MODAL COLLABORATIVE WEB-BASED VIDEO ANNOTATION SYSTEM

CROSS-REFERENCE TO RELATED APPLICATION

The present application is a U.S. nonprovisional patent application of, and claims priority under 35 U.S.C. § 120 to, U.S. nonprovisional patent application Ser. No. 13/627,899, filed Sep. 26, 2012, which '899 nonprovisional patent application and any publications thereof and patents issuing therefrom are hereby incorporated herein by reference, and which '899 nonprovisional patent application is a U.S. nonprovisional patent application of, and claims priority under 35 U.S.C. § 119(e) to, U.S. provisional patent application Ser. No. 61/539,147, filed Sep. 26, 2011, which provisional patent application is incorporated by reference herein. A copy of this provisional patent application is attached hereto as Appendix A, which Appendix is hereby incorporated herein by reference.

The present application also incorporates herein by reference the documents attached hereto as Appendices B, C, and D.

GOVERNMENT SUPPORT

One or more inventions disclosed herein was made with Government support under award number IIS-0855882 by the National Science Foundation. The Government has certain rights in such inventions.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to collaborative video annotation.

Video annotation interfaces to facilitate communication between different stakeholders have been explored by different groups. Interfaces have been developed to support multimedia annotation as educational tools for the distance learning market, such as the Classroom 2000 project and the Microsoft Research Annotation System. The "WACTool" supports P2P capabilities that allow user collaboration and content sharing using voice and digital ink comments over individual frames of a video. "Project Pad" is a standalone web application for adding text notes to media clips and sharing those notes with others. "Video Image Annotation" tool is a Windows application that provides an interface to manually annotate a video with text. "VideoANT" is a web-based video annotation application developed for e-learning, to annotate videos with time point markers and text. "Advene" allows people to design and exchange videos with annotations. "Anvil" is another tool that allows annotation of audiovisual material by inserting time-anchored comments and gesture elements.

There are many video-based interfaces with text annotation that are commercially available. Youtube allows user to annotate videos they upload, and others can see the annotation. "BubblePLY" is a web application that allows users to annotate remote videos hosted on other websites such as Youtube. Users can add text, drawing, pre-defined clipart, subtitles etc. on a remote video to create bubbles (annotated videos) and can edit their own bubbles. "veotag" and "viddler" also support annotations of video content. Sports and News broadcast domains have also seen a significant amount of work dealing with video annotations.

The applications discussed typically support annotations in only one form (mostly text) and lack multimodal capabilities. None of these applications support fine-grained access and navigational control, multimodal annotation grouping, rich annotation positioning and user-based color coding. All of the applications discussed allow some form of video annotation but none of them comprehensively address the issues of collaboratively working on a creative temporal project, such as dance.

A need exists for improvement in collaborative video annotation. This, and other needs, are addressed by one or more aspects of the present invention.

SUMMARY OF THE INVENTION

The present invention includes many aspects and features. Moreover, while many aspects and features relate to, and are described in, the context of collaborative video annotation, the present invention is not limited to use only in this context, as will become apparent from the following summaries and detailed descriptions of aspects, features, and one or more embodiments of the present invention.

Accordingly, one aspect of the present invention relates to a method comprising displaying, to a user via an electronic display associated with an electronic device, a login interface; receiving, at the electronic device from the user, input corresponding to login credentials of a user account of the user; communicating, from the electronic device, data corresponding to the login credentials; displaying, to the user via the electronic display, a video selection interface configured to allow the user to a select a video for viewing; receiving, at the electronic device from the user, input corresponding to selection of a video for viewing; communicating, from the electronic device, data corresponding to the selected video; receiving, at the electronic device, data corresponding to the video, and data corresponding to a plurality of comments associated with the video, each of the plurality of comments being associated with a particular user account of a plurality of user accounts. The method further includes displaying, to the user via the electronic display associated with the electronic device, a video annotation interface comprising a video pane configured to display the video, a video timeline bar including a video play-head indicating a current point of the video which is being played, a segment timeline bar including initial and final handles configured to define a segment of the video for playing, a plurality of comment markers displayed in connection with the video timeline bar, each of the plurality of comment markers corresponding to one of the plurality of comments associated with the video, a comment display pane displaying text corresponding to at least some of the plurality of comments associated with the video, and a comment button configured to allow the user to add a comment to the video. The method still further includes receiving, at the electronic device from the user, input corresponding to selection of a displayed comment marker; and in response to receiving input corresponding to selection of a displayed comment marker, automatically moving the video play-head to a point on the video determined based on the selected comment marker, and displaying, in the video pane, a frame corresponding to the position of the video play-head, and displaying, in the video pane overlaid over the displayed frame of the video, one or more annotations associated with the comment marker.

In a feature of this aspect, automatically moving the video play-head to a point on the video determined based on the selected comment marker comprises automatically moving the video play-head to a point of the video a predetermined period of time prior to a point on the video associated with the comment marker. In at least some implementations, the predetermined period of time is two seconds.

In a feature of this aspect, in addition to automatically moving the video play-head to a point on the video determined based on the selected comment marker, the method includes automatically defining a segment corresponding to the selected comment marker utilizing the segment timeline bar by moving the initial handle of the segment timeline bar to a beginning point corresponding to the point on the video determined based on the selected comment marker, and automatically moving the final handle of the segment timeline bar to an end point corresponding to a second point on the video determined based on the selected comment. In at least some implementations, the method further includes receiving, at the electronic device from the user, input corresponding to engagement of a play button of the video annotation interface; and repeatedly playing the video in the video pane in a loop from a frame corresponding to the position of the initial handle to a frame corresponding to the position of the final handle. In at least some implementations, the received data corresponding to a plurality of comments associated with the video includes data corresponding to a particular point comment associated with the later-selected comment marker, and wherein the data corresponding to the particular point comment includes an identification of a point of the video associated with the comment. In at least some implementations, the identification of a point of the video comprises a timestamp. In at least some implementations, the identification of a point of the video comprises a frame identification. In at least some implementations, the received data corresponding to a plurality of comments associated with the video includes data corresponding to a particular segment comment associated with the later-selected comment marker, and wherein the data corresponding to the particular segment comment includes an identification of a starting point of a segment of the video associated with the particular segment comment. In at least some implementations, the data corresponding to the particular segment comment includes an identification of a length of the segment comment. In at least some implementations, the data corresponding to the particular segment comment includes an identification of an end point of a segment of the video associated with the particular segment comment.

In a feature of this aspect, the displayed video annotation interface further comprises a playback speed slider configured to allow the user to vary the speed of playback of the video in the video pane.

In a feature of this aspect, the step of receiving, at the electronic device, data corresponding to the video, and data corresponding to a plurality of comments associated with the video comprises receiving such data at the electronic device via a communication adapter.

In a feature of this aspect, the electronic display is part of the electronic device.

In a feature of this aspect, the electronic device is a tablet, slate computer, or smartphone.

In a feature of this aspect, the electronic display is connected to the electronic device.

In a feature of this aspect, the electronic display is a touchscreen display, and wherein at least one of the steps of receiving, at the electronic device from the user, input, comprises receiving input from the user input via the touchscreen display.

In a feature of this aspect, the method further includes, in response to receiving input corresponding to selection of a displayed comment marker, highlighting a portion of the video displayed in the video pane that corresponds to a focus area associated with a comment corresponding to the comment marker.

In a feature of this aspect, the method further includes, in response to receiving input corresponding to selection of a displayed comment marker, zooming in on a portion of the video displayed in the video pane that corresponds to a zoom area associated with a comment corresponding to the comment marker.

In a feature of this aspect, the method further includes receiving, at the electronic device from the user, input corresponding to selection of a baseline definition tool; receiving, at the electronic device from the user, input corresponding to drawing a baseline line segment on the video pane; receiving, at the electronic device from the user, input representing a baseline measurement for the user-drawn baseline line segment; receiving, at the electronic device from the user, input corresponding to drawing a measurement line segment on the video pane; automatically determining a measurement for the measurement line segment based on a length of the user-drawn baseline line segment, the user input representing a baseline measurement for the user-drawn baseline line segment, and a length of the user-drawn measurement line segment. In this feature, the method still further includes displaying, to the user via the electronic display, the automatically determined measurement for the measurement line segment.

In a feature of this aspect, each of the plurality of comment markers is color coded based on the particular user account associated with a comment the comment marker is associated with.

In a feature of this aspect, the one or more annotations includes a text annotation.

In a feature of this aspect, the one or more annotations includes a video annotation.

In a feature of this aspect, the one or more annotations includes an audio annotation.

In a feature of this aspect, the one or more annotations includes a drawing annotation.

In a feature of this aspect, the one or more annotations includes annotations in a plurality of different modalities.

In a feature of this aspect, wherein the one or more annotations includes annotations in two or more of the following modalities: text, drawing, video, audio.

Another aspect of the present invention relates to a method comprising receiving, at an electronic device, data corresponding to a video, and data corresponding to a plurality of comments associated with the video, each of the plurality of comments being associated with a particular user account of a plurality of user accounts; displaying, to a user via an electronic display associated with the electronic device, a video annotation interface comprising a video pane configured to display the video, a video timeline bar including a video play-head indicating a current point of the video which is being played, a segment timeline bar including initial and final handles configured to define a segment of the video for playing, and a plurality of comment markers displayed in connection with the video timeline bar, each of the plurality of comment markers corresponding to one of the plurality of comments associated with the video. The method further includes receiving, at the electronic device from the user, input corresponding to selection of a displayed comment marker; and in response to receiving input corresponding to selection of a displayed comment marker, automatically moving the video play-head to a point on the video determined based on the selected comment marker, and displaying, in the video pane, a frame corresponding to the position of the video play-head, and displaying, in the video pane overlaid over the displayed frame of the video, one or more comments associated with the comment marker.

In a feature of this aspect, automatically moving the video play-head to a point on the video determined based on the selected comment marker comprises automatically moving the video play-head to a point of the video a predetermined period of time prior to a point on the video associated with the comment marker. In at least some implementations, the predetermined period of time is two seconds.

In a feature of this aspect, in addition to automatically moving the video play-head to a point on the video determined based on the selected comment marker, the method includes automatically defining a segment corresponding to the selected comment marker utilizing the segment timeline bar by moving the initial handle of the segment timeline bar to a beginning point corresponding to the point on the video determined based on the selected comment marker, and automatically moving the final handle of the segment timeline bar to an end point corresponding to a second point on the video determined based on the selected comment. In at least some implementations, the method further includes receiving, at the electronic device from the user, input corresponding to engagement of a play button of the video annotation interface; and repeatedly playing the video in the video pane in a loop from a frame corresponding to the position of the initial handle to a frame corresponding to the position of the final handle. In at least some implementations, the received data corresponding to a plurality of comments associated with the video includes data corresponding to a particular point comment associated with the later-selected comment marker, and wherein the data corresponding to the particular point comment includes an identification of a point of the video associated with the comment. In at least some implementations, the identification of a point of the video comprises a timestamp. In at least some implementations, the identification of a point of the video comprises a frame identification. In at least some implementations, the received data corresponding to a plurality of comments associated with the video includes data corresponding to a particular segment comment associated with the later-selected comment marker, and wherein the data corresponding to the particular segment comment includes an identification of a starting point of a segment of the video associated with the particular segment comment. In at least some implementations, the data corresponding to the particular segment comment includes an identification of a length of the segment comment. In at least some implementations, the data corresponding to the particular segment comment includes an identification of an end point of a segment of the video associated with the particular segment comment.

Another aspect of the present invention relates to a method comprising displaying, to a user via an electronic display associated with an electronic device, a login interface; receiving, at the electronic device from the user, input corresponding to login credentials of a user account of the user; communicating, from the electronic device, data corresponding to the login credentials; displaying, to the user via the electronic display, a video selection interface configured to allow the user to a select a video for viewing; receiving, at the electronic device from the user, input corresponding to selection of a video for viewing; communicating, from the electronic device, data corresponding to the selected video; and receiving, at the electronic device, data corresponding to the video, and data corresponding to a plurality of comments associated with the video, each of the plurality of comments being associated with a particular user account of a plurality of user accounts. The method further includes displaying, to the user via the electronic display associated with the electronic device, a video annotation interface comprising a video pane configured to display the video, a video timeline bar including a video play-head indicating a current point of the video which is being played, a segment timeline bar including initial and final handles configured to define a segment of the video for playing, a plurality of comment markers displayed in connection with the video timeline bar, each of the plurality of comment markers corresponding to one of the plurality of comments associated with the video, a comment display pane displaying text corresponding to at least some of the plurality of comments associated with the video, and a comment button configured to allow the user to add a comment to the video. The method still further includes receiving, at the electronic device from the user, input corresponding to selection of a particular portion of the video; receiving, at the electronic device from the user, input corresponding to engagement of the comment button; in response to receiving input corresponding to engagement of the comment button, displaying, to the user via the electronic display associated with the electronic device, a comment interface; receiving, at the electronic device from the user, input corresponding to one or more desired annotations; and in response to receiving input corresponding to one or more desired annotations, associating the input one or more annotations with the selected particular portion of the video, updating the video annotation interface so that the plurality of comment markers displayed in connection with the video timeline bar includes a new comment marker indicating a point on the video timeline bar corresponding to the particular portion of the video, and displaying an indication of the input one or more annotations overlaid over the video in the video pane.

In a feature of this aspect, the step of associating the input one or more annotations with the selected particular portion of the video comprises communicating, by the electronic device, data corresponding to the input one or more annotations and the selected particular portion of the video to a remote server for storage.

In a feature of this aspect, the step of associating the input one or more annotations with the selected particular portion of the video comprises storing, in a computer readable medium, an association of the input one or more annotations with the selected particular portion of the video.

In a feature of this aspect, the step of associating the input one or more annotations with the selected particular portion of the video comprises storing, in a computer readable medium at the electronic device, an association of the input one or more annotations with the selected particular portion of the video.

In a feature of this aspect, the particular portion of the video is a point.

In a feature of this aspect, the particular portion of the video is a frame.

In a feature of this aspect, the particular portion of the video is a segment.

In a feature of this aspect, receiving, at the electronic device from the user, input corresponding to one or more desired annotations includes receiving input corresponding to text for a text annotation.

In a feature of this aspect, receiving, at the electronic device from the user, input corresponding to one or more desired annotations includes receiving input corresponding to a drawing annotation.

In a feature of this aspect, receiving, at the electronic device from the user, input corresponding to one or more desired annotations includes receiving input corresponding to text for a text annotation.

In a feature of this aspect, receiving, at the electronic device from the user, input corresponding to one or more desired annotations includes receiving input corresponding to text for a text annotation and receiving input corresponding to selecting a location for the text annotation to be displayed.

In a feature of this aspect, receiving, at the electronic device from the user, input corresponding to one or more desired annotations includes receiving input corresponding to text for a text annotation and receiving input corresponding to moving the text annotation.

In a feature of this aspect, receiving, at the electronic device from the user, input corresponding to selection of a particular portion of the video comprises receiving input corresponding to selection of a segment that includes input corresponding to moving the initial handle of the segment timeline bar and moving the final handle of the segment timeline bar.

In a feature of this aspect, the method further includes loading, at the electronic device, a key code library representing an association of keys with one or more respective desired annotations, and wherein receiving, at the electronic device from the user, input corresponding to one or more desired annotations comprises receiving input corresponding to a particular key which is associated with one or more respective desired annotations in the key code library.

In a feature of this aspect, receiving, at the electronic device from the user, input corresponding to one or more desired annotations includes receiving input corresponding to selection of a color and input corresponding to a drawing annotation.

In a feature of this aspect, receiving, at the electronic device from the user, input corresponding to one or more desired annotations includes receiving input corresponding to selection of a brush size for a drawing annotation and input corresponding to a drawing annotation.

In a feature of this aspect, receiving, at the electronic device from the user, input corresponding to one or more desired annotations includes receiving input corresponding to a video annotation.

In a feature of this aspect, receiving, at the electronic device from the user, input corresponding to one or more desired annotations includes receiving input corresponding to a video annotation via a webcam.

In a feature of this aspect, receiving, at the electronic device from the user, input corresponding to one or more desired annotations includes receiving input corresponding to an audio annotation.

In a feature of this aspect, receiving, at the electronic device from the user, input corresponding to one or more desired annotations includes receiving input corresponding to an audio annotation via a microphone.

In a feature of this aspect, receiving, at the electronic device from the user, input corresponding to one or more desired annotations includes receiving input corresponding to a video or audio annotation via an indication of a file representing such an annotation.

In a feature of this aspect, the comment interface is overlaid over the video annotation interface.

In a feature of this aspect, the comment interface is overlaid over the video pane.

Another aspect of the present invention relates to a method comprising displaying, to a user via an electronic display associated with an electronic device, a login interface; receiving, at the electronic device from the user, input corresponding to login credentials of a user account of the user; communicating, from the electronic device, data corresponding to the login credentials; displaying, to the user via the electronic display, a video selection interface configured to allow the user to a select a video for viewing; receiving, at the electronic device from the user, input corresponding to selection of a video for viewing; communicating, from the electronic device, data corresponding to the selected video; receiving, at the electronic device, data corresponding to the video, and data corresponding to a plurality of comments associated with the video, each of the plurality of comments being associated with a particular user account of a plurality of user accounts; and displaying, to the user via the electronic display associated with the electronic device, a video annotation interface comprising a video pane configured to display the video, a video timeline bar including a video play-head indicating a current point of the video which is being played, a segment timeline bar including initial and final handles configured to define a segment of the video for playing, a plurality of comment markers displayed in connection with the video timeline bar, each of the plurality of comment markers corresponding to one of the plurality of comments associated with the video, a comment display pane displaying text corresponding to at least some of the plurality of comments associated with the video, and a comment button configured to allow the user to add a comment to the video. The method further includes receiving, at the electronic device from the user, input corresponding to engagement of a play button of the video annotation interface; playing, in the video pane, the video; receiving, at the electronic device from the user, input corresponding to engagement of the comment button; in response to receiving input corresponding to engagement of the comment button, pausing playback of the video, and displaying, to the user via the electronic display associated with the electronic device, a comment interface; receiving, at the electronic device from the user, input corresponding to one or more desired annotations; and in response to receiving input corresponding to one or more desired annotations, associating the input one or more annotations with the selected particular portion of the video, updating the video annotation interface so that the plurality of comment markers displayed in connection with the video timeline bar includes a new comment marker indicating a point on the video timeline bar corresponding to the particular portion of the video, and displaying an indication of the input one or more annotations overlaid over the video in the video pane.

In a feature of this aspect, the method further includes loading, at the electronic device, a key code library representing an association of keys with one or more respective desired annotations, and wherein receiving, at the electronic device from the user, input corresponding to one or more desired annotations comprises receiving input corresponding to a particular key which is associated with one or more respective desired annotations in the key code library.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals, and wherein:

FIG. 4 illustrates a video upload interface of the exemplary application of FIG. 2;

FIG. 5 illustrates the display of properties of a video on the video selection interface of FIG. 3;

FIG. 14 illustrates a journal interface of the exemplary application of FIG. 2.

DETAILED DESCRIPTION

Figure 1:
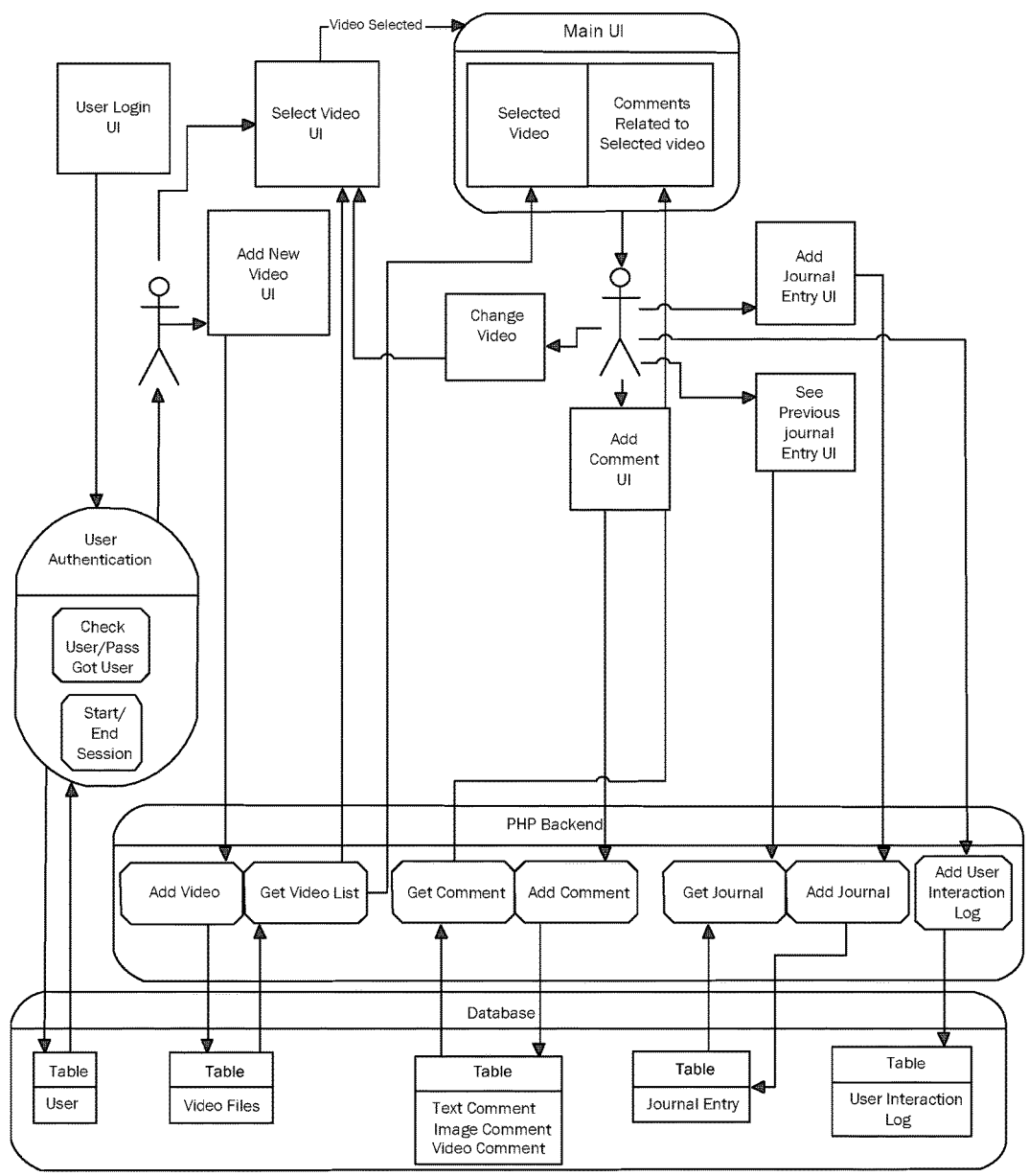
FIG. 1 illustrates the architecture of an implementation of an exemplary application.

As a preliminary matter, it will readily be understood by one having ordinary skill in the relevant art ("Ordinary Artisan") that the present invention has broad utility and application. As should be understood, any embodiment may incorporate only one or a plurality of the above-disclosed aspects of the invention and may further incorporate only one or a plurality of the above-disclosed features. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

One or more preferred embodiments in accordance with the present invention represent an online collaboration system and tool. In one or more preferred implementations, such a system and tool represents a web-based application that allows users to annotate a video using a variety of modalities including text, digital ink, audio, and video. An interface which allows allow notes, comments or sketches to be added in the form of texts or images on a video can be characterized as an annotation interface.

The annotation system utilized by such an application can be characterized as "multimodal" in that it provides support for multiple modes of input or output. For example, in one or more preferred implementations, an annotation system supports comment input in the form of text, sketching, audio, and video and hence allows input in four different modes. This can be contrasted with various existing video systems, such as, for example, Youtube which supports a text modality, viddler, which supports video and text modalities, bublePly, which supports clipart and text modalities, and videoANT, which supports a text modality.

The annotation system also supports visual indexing of annotations and a rich navigational control for inserting and editing video annotations. In one or more preferred implementations, an annotation system utilizes context based navigation, which provides a way to navigate to a certain point in time of a video by linking that point to a comment or annotation. In an exemplary such implementation, when a comment is added to a video or image, it is added in context to a point or span on the timeline of video. The comment registers the time of the video where the comment has been made. Later, a user can navigate through the comments utilizing either a comment-list or markers on a video timeline exposing the frame(s) of video in context of which that particular comment was made.

Preferably, annotations are anchored to a point in the timeline of a video, but are stored externally in a separate file. It is believed that annotations can enhance the end-user experience when they are displayed in context (at a cue-point where they were made).

Users can upload videos and then post comments in the form of text, digital sketches, audio, and video comments. Users can thereafter log in, analyze the video and read (and listen to or view) comments posted by other users (such as, for example, choreographers) in context, and can respond with video, ink, audio, or text comments.

Such an application preferably enables synchronous collaboration as multiple users can login and work simultaneously, as well as asynchronous collaboration as different users can insert annotations across multiple sessions separated in time. Exemplary synchronous collaboration might involve, for example, collaboration between two or more users located in the same or different spaces interacting with an annotation system concurrently. Video-conferencing is an example of synchronous collaboration in another context. Exemplary asynchronous collaboration might involve collaboration between two or more users located in the same or different spaces interacting with an annotation system at different, disjoint times. Email is an example of asynchronous collaboration in another context.

Such video annotation systems, and related methodologies, are applicable for use in a wide variety of contexts. For example, as noted elsewhere herein, one such context is a dance context.

In the dance production process, choreographers often use video cameras to record a rehearsal, and, then, all participants might sit on a studio floor and discuss and critique the rehearsal, for example by watching the video on a small TV. However, the nature of playback, such as, for example, as VCR playback, might restrict the ability to navigate the rehearsal video. It is believed that a digital video interface with annotation support would ease the rehearsal process, and a collaborative video annotation system is contemplated for use in a dance context.

Another exemplary context is a science or research context. For example, in an exemplary methodology of use, a video annotation system might be utilized by an ornithologist to review and annotate video of a particular bird.

Other exemplary contexts include an educational context (such as online education), a physical therapy context (e.g. annotation exercises or movements), or a sports context (e.g. annotating game or practice tapes).

It will be appreciated that these are merely exemplary contexts, and many other contexts are contemplated as well.

FIG. 1 illustrates the architecture of an implementation of an exemplary application, which might be configured for use in one or more of these contexts, or another context (or may be generic to two or more contexts). Such implementation utilizes HTML5 and Javascript and works in all major web browsers, supporting mp4 and mov video files. After logging in, users can load videos, play them, and insert annotations. The application sends the text, digital ink drawings, or video annotations to a MySQL database via PHP. Text is stored as a string while digital ink drawings are stored as a snapshot of the transparent canvas on which the drawing was made. Video comments are stored (e.g. as an .mov file) in a separate folder. Stored annotations can then subsequently be retrieved from the MySQL database. Preferably, the annotations are first retrieved as a proxy XML feed, which is written dynamically using PHP, and then are rendered in the application.

Figure 2:
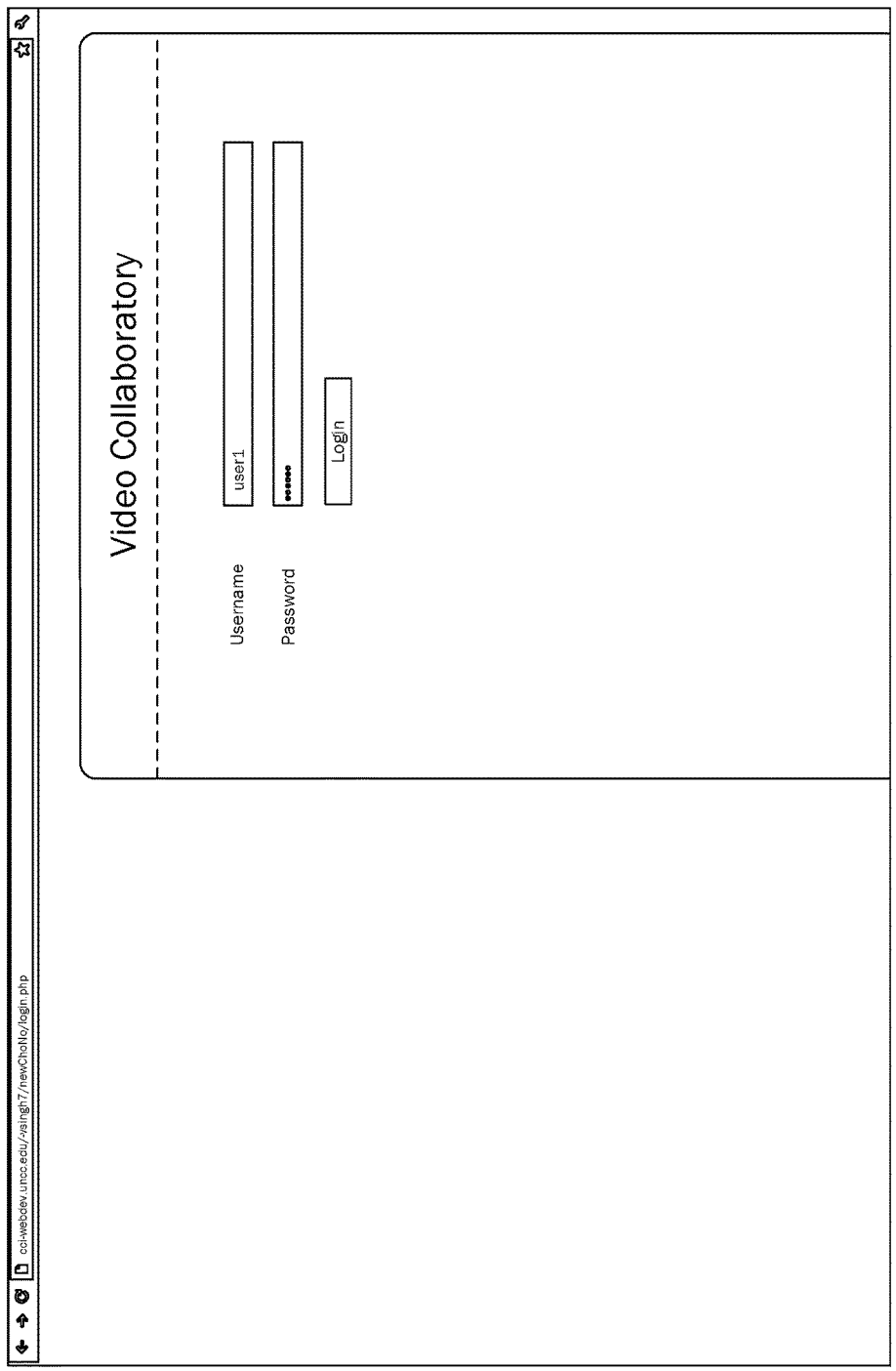
FIG. 2 illustrates a login interface of an exemplary application.

Users can access the exemplary application via a web browser by navigating their web browser to an address associated with the application. Thereafter, if users are not already logged in (which the application might determine utilizing, for example, cookie information), users will be presented with a login interface which allows a user to login, as illustrated in FIG. 2. Each user is preferably assigned a username and password, which can be accomplished in various ways. For example, these may be pre-assigned and configured into the application, may be entered by a system administrator, may be requested by a user, or may be selected by a user.

Logging in both allows user comments to be associated with that user, and additionally might provide access to private videos that are not publicly available. Further, in one or more preferred implementations, each user has a color assigned to them so that each user's comments are color-coded.

Figure 3:
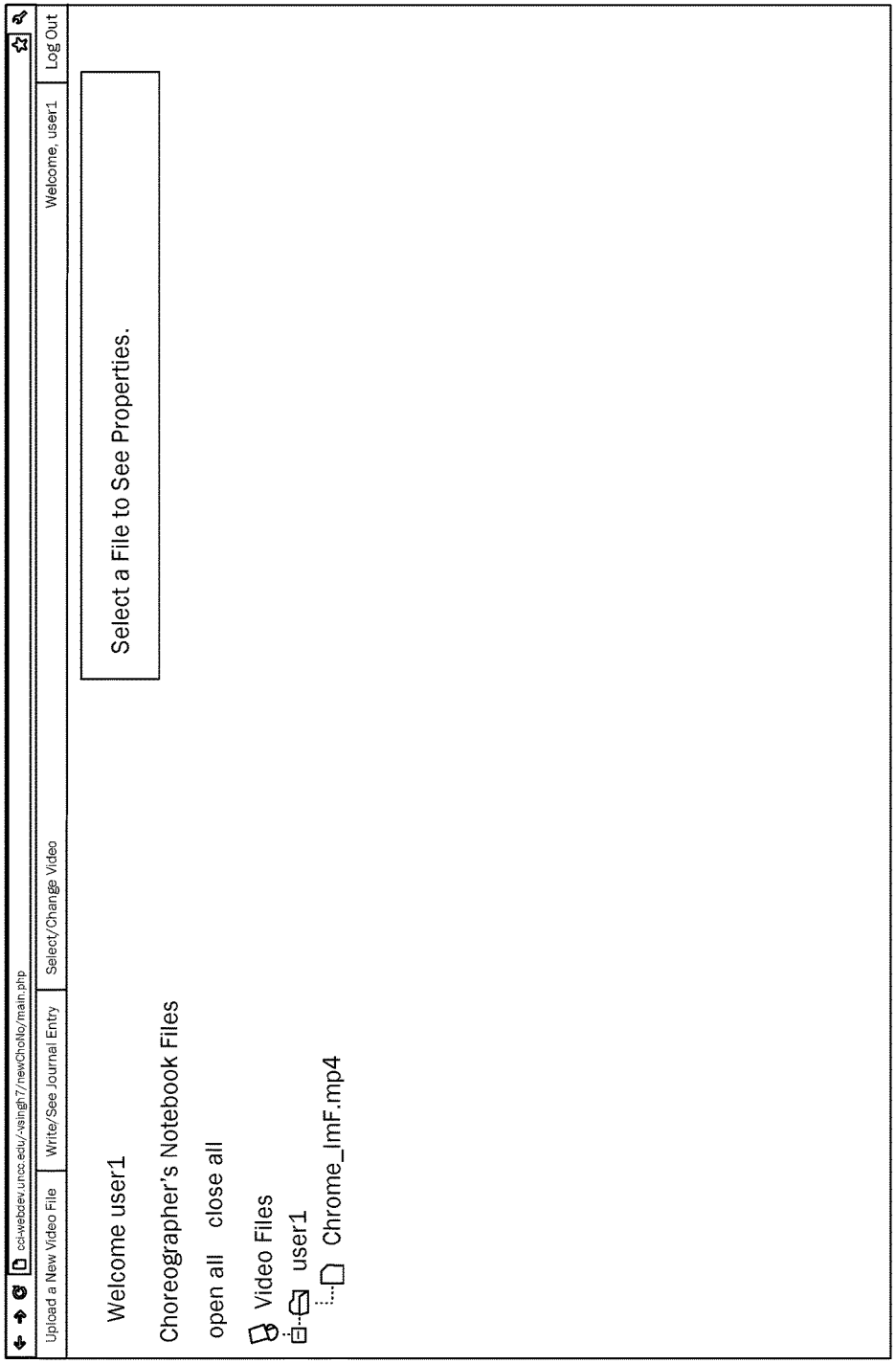
FIG. 3 illustrates a video selection interface of the exemplary application of FIG. 2.

Upon logging in, users are presented with a video selection interface, as illustrated in FIG. 3. The video selection interface includes a file display section which displays files and folders forming part of a file archival system of the application. This file archival system represents a repository of files stored in different folders following a tree structure, and allows files to be stored in various named folders making it easier for users to access a required file in an efficient manner. In one or more preferred implementations, some files or folders of this archival system are private, and are only viewable and accessible by certain users who have the appropriate permissions. Such permissions may be sharable, and/or may only be grantable by a system administrator.

The application includes a navigation bar which allows users to effect various tasks, such as navigating between the video selection interface and various other interfaces. For example, the navigation bar allows a user to upload a video, access a journal, select a video (via the video selection interface), or log out.

A user can utilize the navigation bar to effect navigation to a video upload interface, which is illustrated in FIG. 4. The video upload interface includes a file display system, and allows a user to select a folder to upload a video to, as well as a video to upload. The video upload interface further allows a user to add a description of the video. Preferably, this description can be edited later by the user, or, in at least some implementations, by another use with appropriate permissions.

Upon uploading a video, a user can return (and in at least some implementations is automatically taken back) to the video selection screen, where the user can then select that video (or another video) for annotation and/or review.

Figure 5:
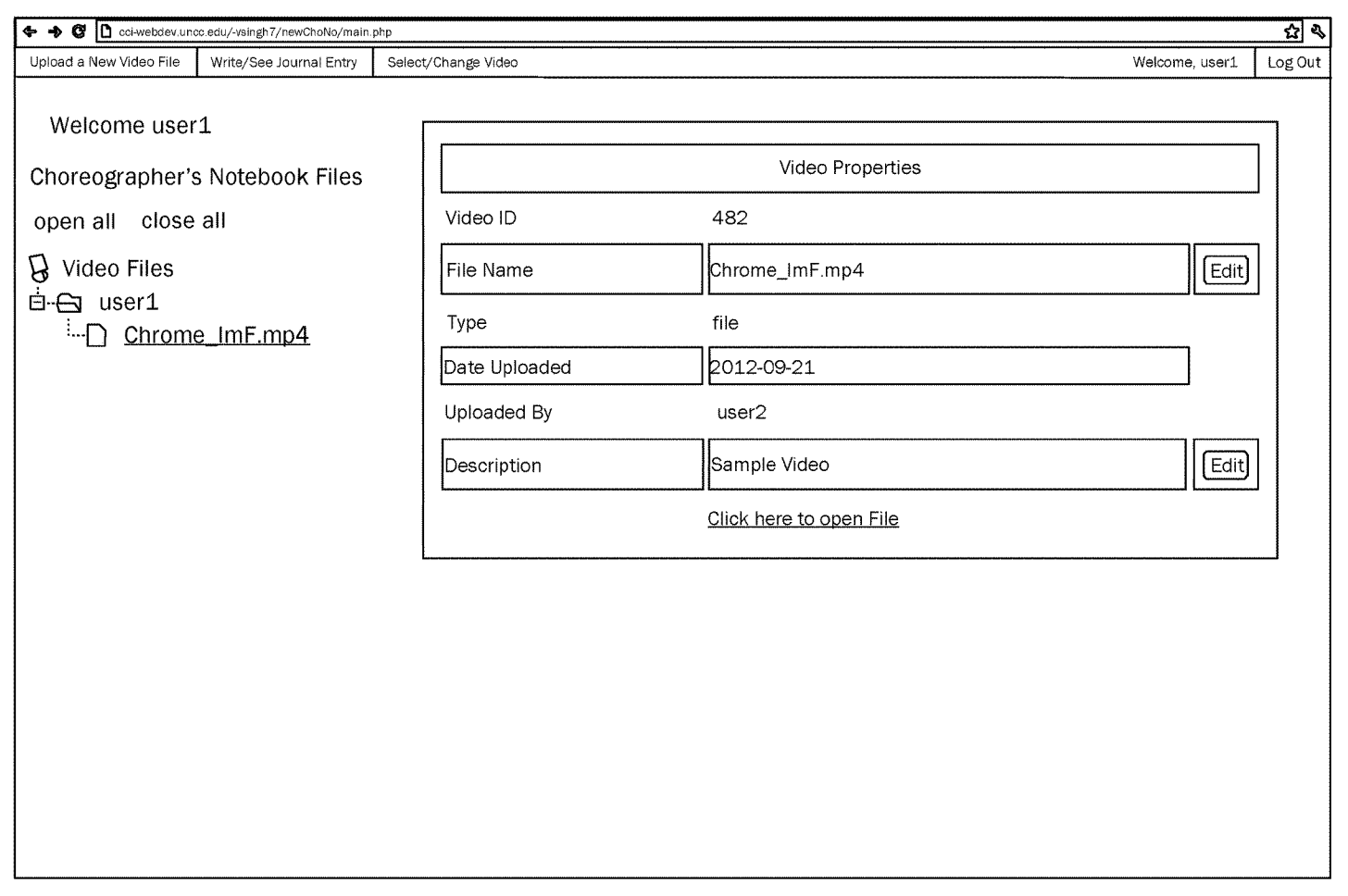

Upon initially identifying a video using the video selection interface, properties of that video are provided, as illustrated in FIG. 5. A user can then select that video for annotation and/or review.

Figure 6:
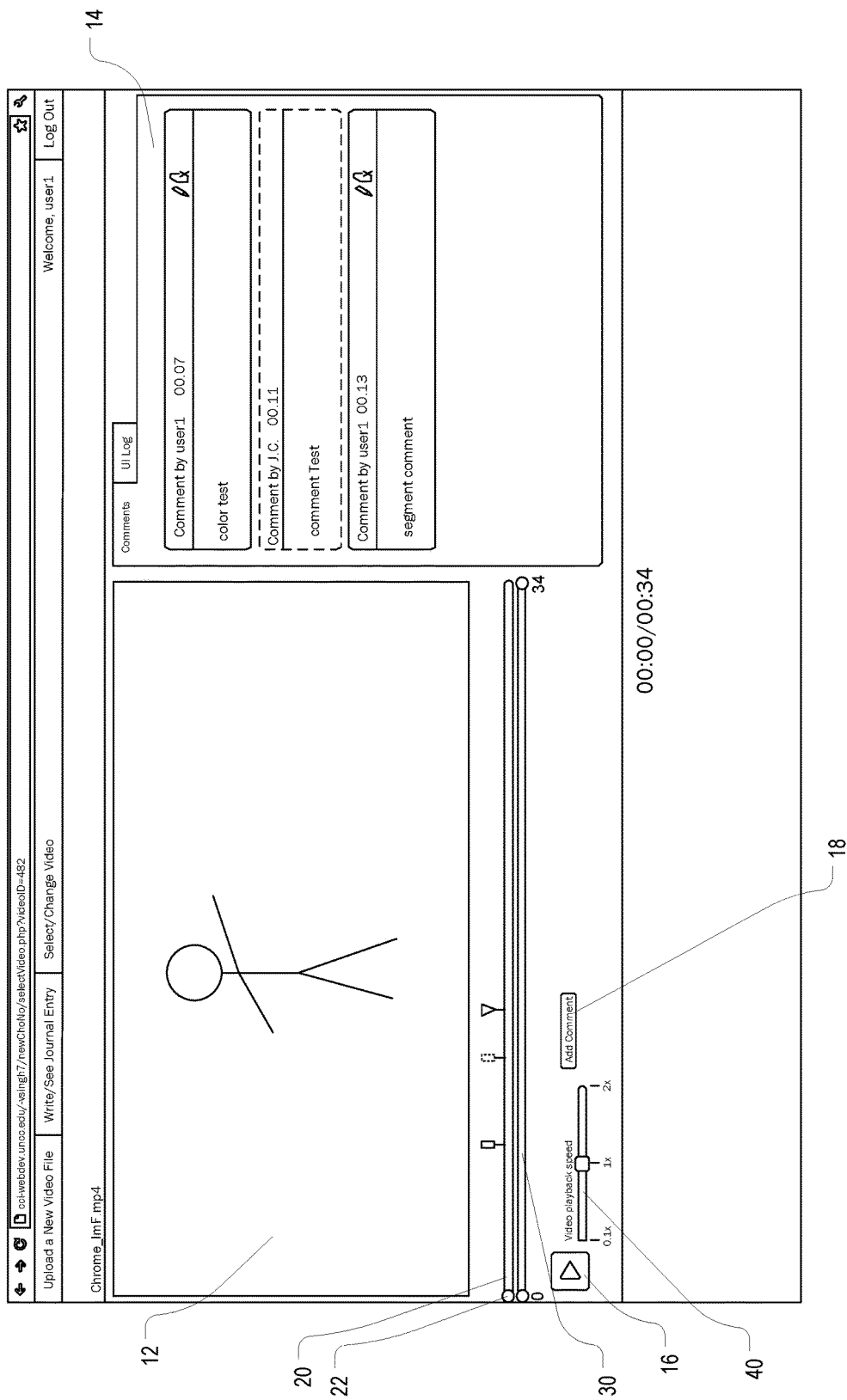
FIG. 6 illustrates a video annotation interface of the exemplary application of FIG. 2.

Upon selecting a video, a user is taken to a video annotation interface, as illustrated in FIG. 6, which shows the selected video and comments posted to that video by users (preferably including both comments posted by other users and comments posted by the logged in user, which may be color coded as described herein, such as, for example, by outlining each comment and/or the commenting user's name in a color associated with the commenting user). In the illustrated implementation, the video annotation interface comprises a video pane 12 with controls therebelow, and a display pane 14 with tabs for alternately displaying a comment display pane and a change log pane.

The controls below the video pane 12 include a video timeline bar 20, a segment timeline bar 30, a play button 16, a playback speed slider 40, and a comment button 18.

Figure 7A:
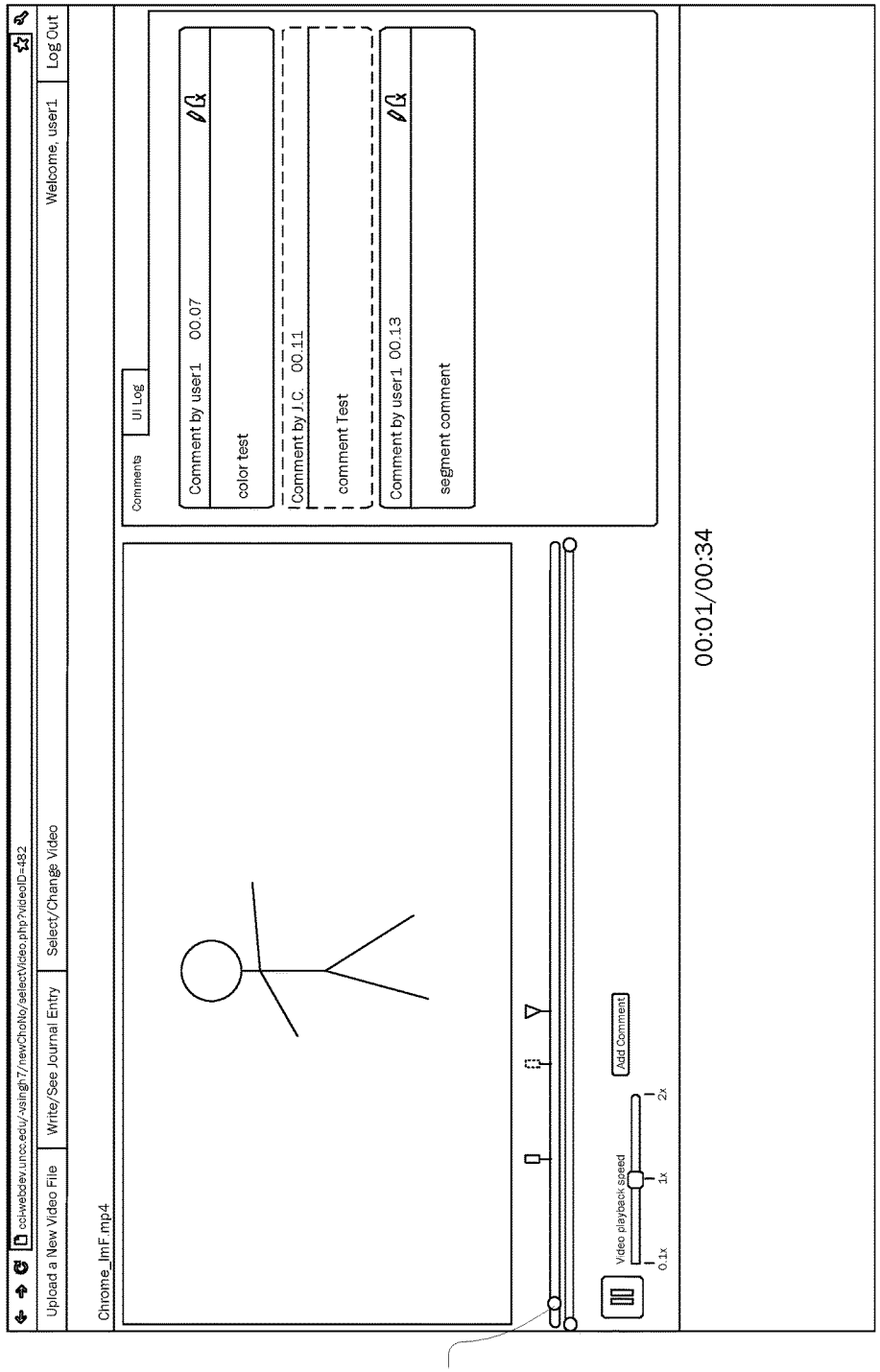
FIGS. 7A-C illustrate functionality of a video play-head of the video annotation interface of FIG. 6.
Figure 7B:
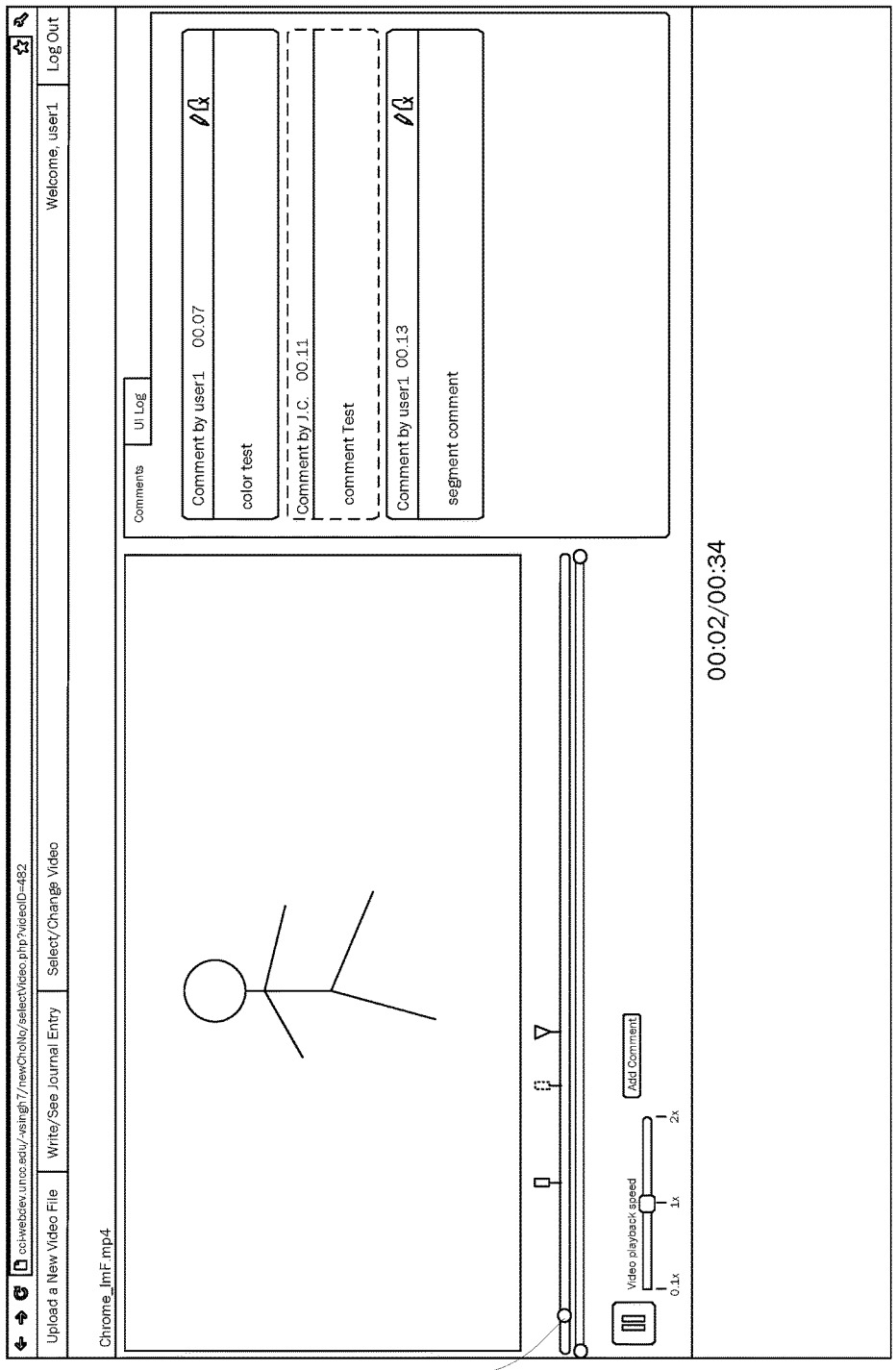
Figure 7C:
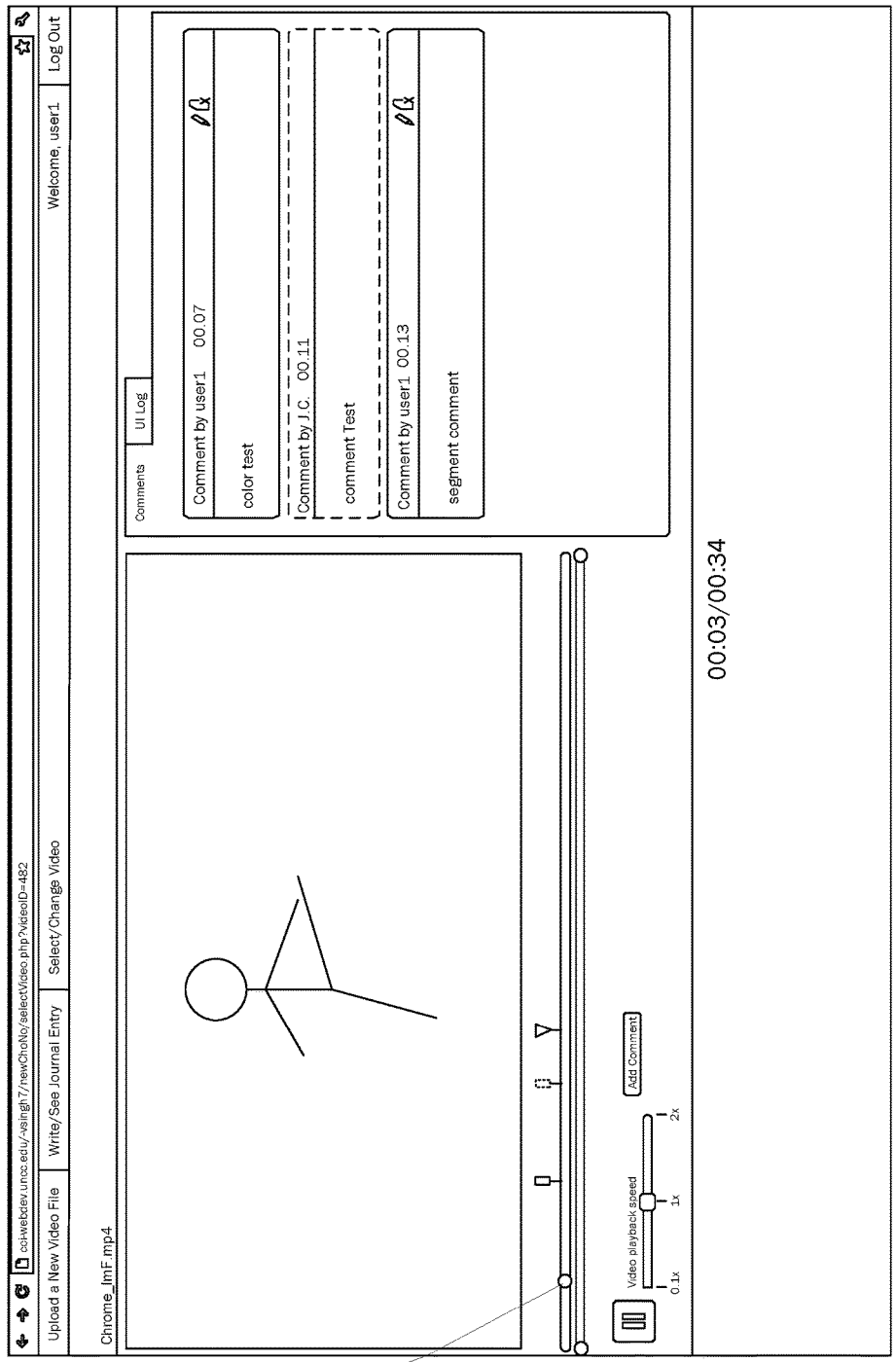

The video annotation interface allows a user to play the selected video with the play button. The video timeline bar includes a video play-head 22 which indicates relatively what frame or portion of the video is currently displayed/being played, as illustrated in FIGS. 7A-7C. Preferably, the annotation interface displays (such as, for example, in seconds) where in playback the video play-head 22 currently is.

The segment timeline bar can be utilized by a user to limit playback to a particular segment of the video. The segment timeline bar includes an initial position handle 32 and a final position handle 34. In at least some implementations, each position handle 32,34 preferably displays in association therewith a time of the video the handle is currently positioned at, as illustrated in FIG. 6 (such text is omitted for clarity in many illustrations). Each of these position handles can be slid along the segment timeline bar by a user (e.g. using a mouse or a touchscreen), as illustrated by the arrows in FIGS. 8A-B, and in some implementations can even be slid to the same point, but in preferred implementations cannot be slid past one another (although in at least some implementations they may be). The handles can be utilized by a user to define a segment to limit playback to (or associate a comment therewith, as described hereinbelow). In one or more preferred implementations, the handles are initially set to the start and end points of the video, and when the handles are so set the segment timeline bar appears generally similar in appearance to the video timeline bar (e.g. being displayed in the same color), but when one or both handles are moved so as to define a segment which is less than the entire video, the portion of the segment timeline bar between the handles is highlighted (e.g. is displayed in a brighter, darker, or different color, such as bright yellow).

In a preferred implementation, a segment timeline bar is implemented utilizing HTML and a jQuery UI slider library, currently available at jqueryui.com.

Figure 8A:
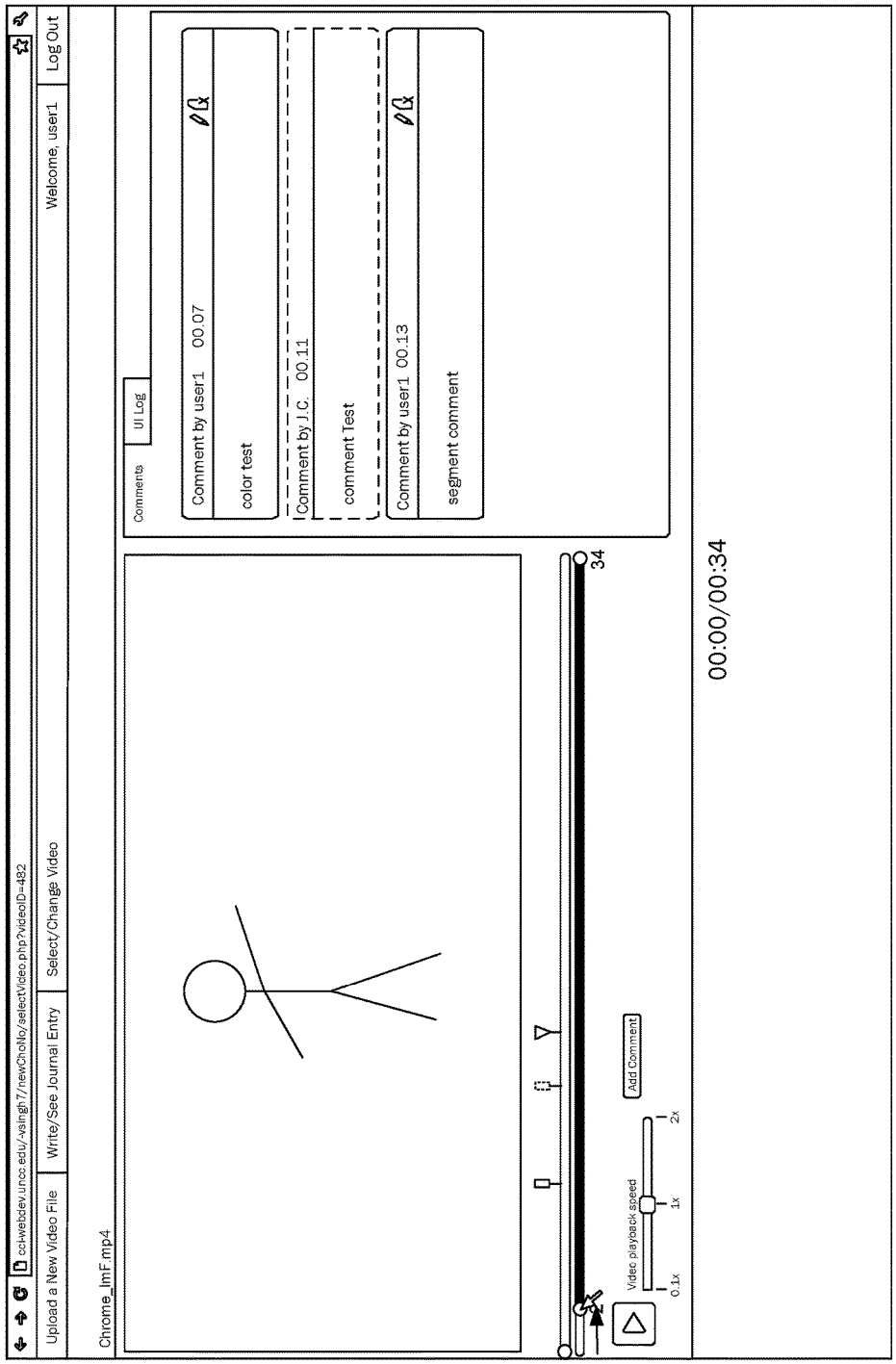
FIGS. 8A-H illustrate segment functionality of the video annotation interface of FIG. 6.
Figure 8B:
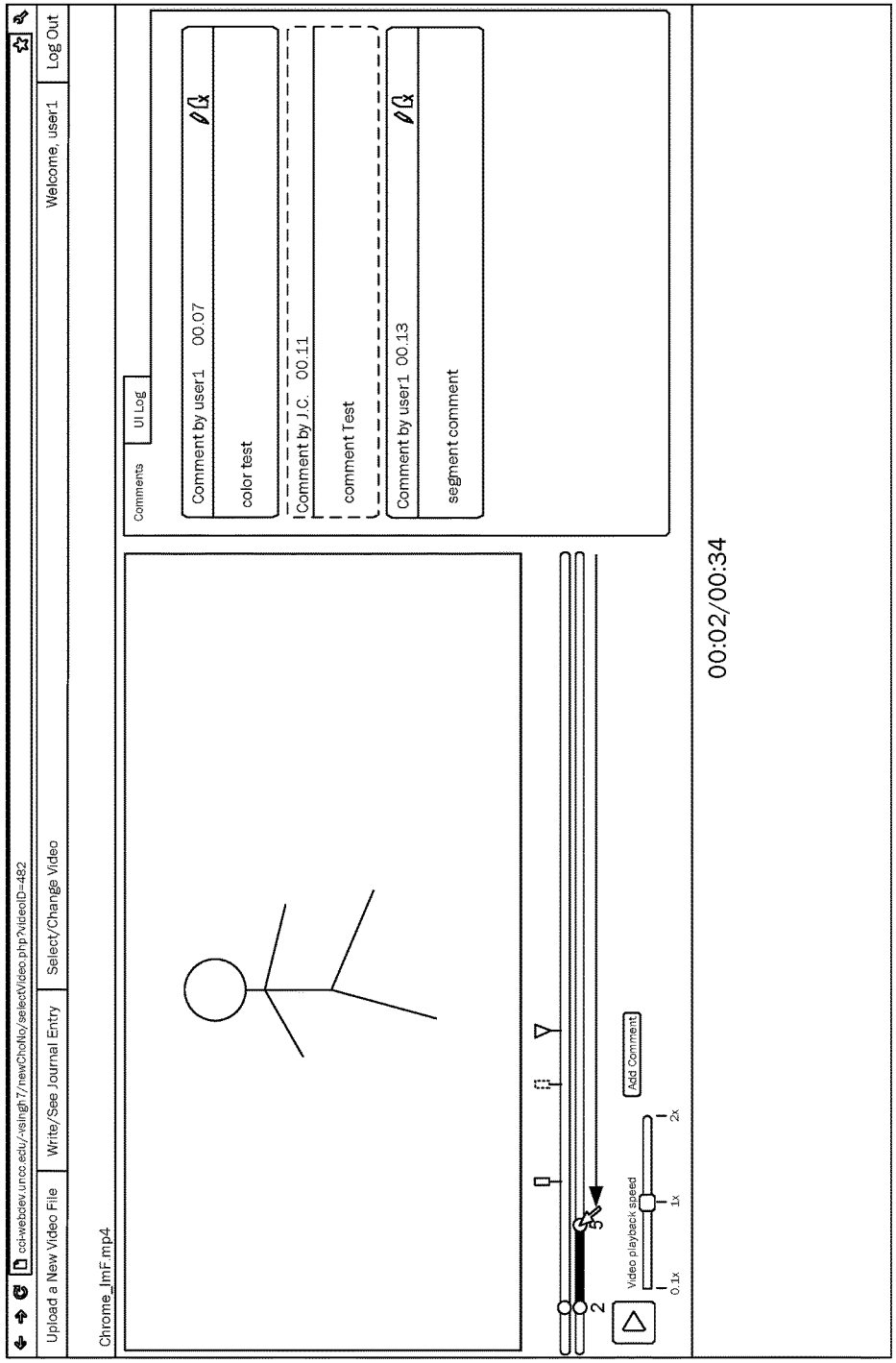

If a particular segment is selected (as opposed to the entire video), then the video play-head can only be set as early as the time corresponding to the initial position handle (and will preferably be moved there if it was set to an earlier point in the video before the segment was defined, as illustrated by reference to FIGS. 8A-B), and can only be set as late as the time corresponding to the final position handle (and will preferably be moved there if it was set to a later point in the video before the segment was defined). Thereafter, when playback is commenced, the video will only play the portion of the video corresponding to the segment, and once it reaches the time corresponding to the final position handle, it will loop back to the time corresponding to the initial position handle.

In this way, the segment timeline bar can be characterized as providing a looping mechanism that works by selecting a defined segment of video and looping the playback repeatedly through that segment. The mechanism involves the use of the timeline handles which can be dragged to indicate the beginning and end of a segment for looping. For example, if a dancer wants to see only a small part of video repeatedly so that he or she can master a given movement before proceeding to the next, he or she can select a segment of video he or she wants to see again and again.

In one or more preferred implementations, when no segment is selected and the handles of the segment timeline bar are at the start and end of the video, double clicking anywhere on the segment timeline bar will automatically move the handles to correspond to a segment of a certain length centered around the point clicked on. Such certain length may be a predefined or preconfigured length, such as, for example, four seconds, and/or may be calculated or determined based in whole or in part on a total length of the video. In at least some implementations, such a certain length may be wholly or partially user configurable.

Figure 8C:
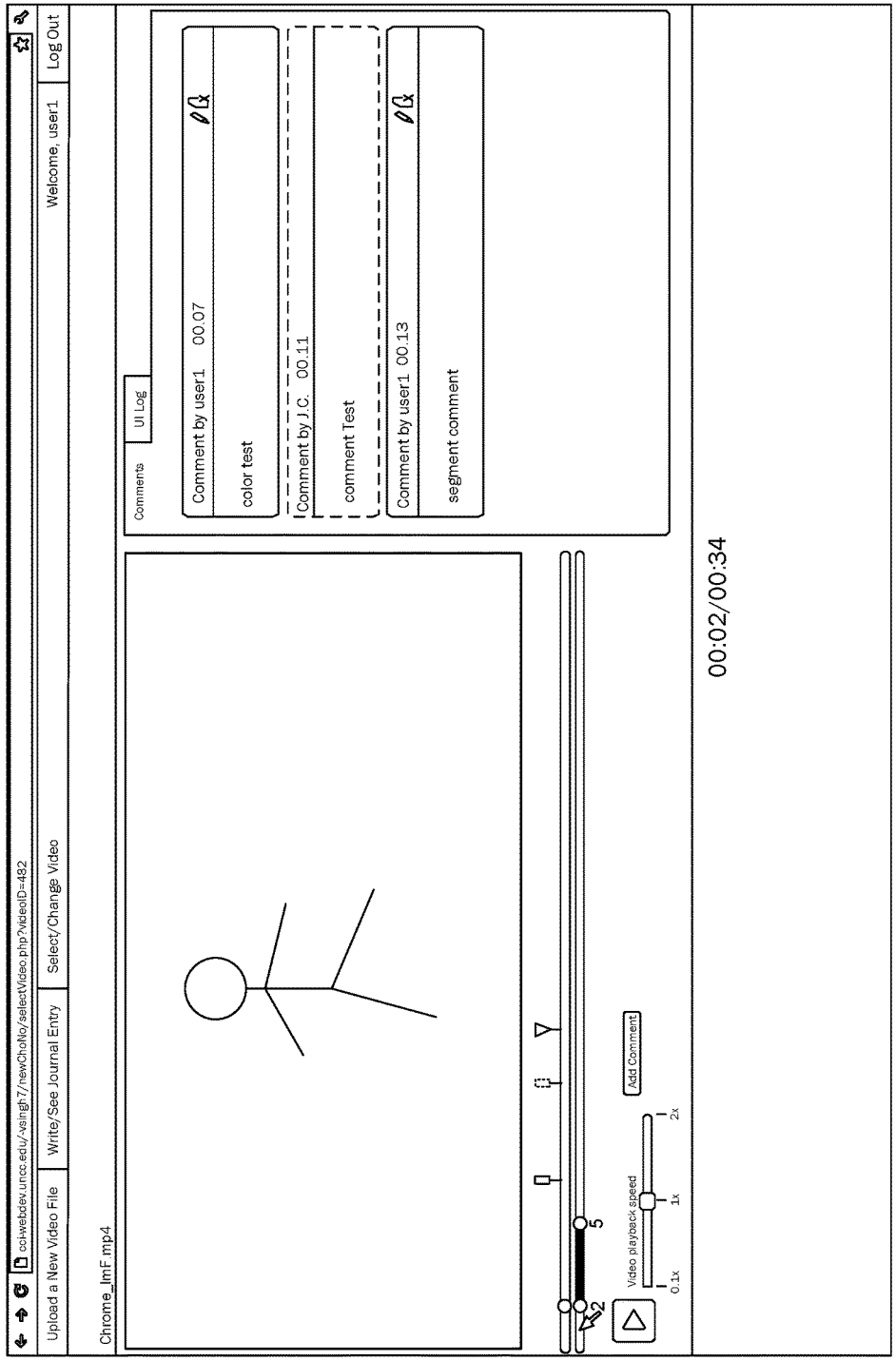
Figure 8D:
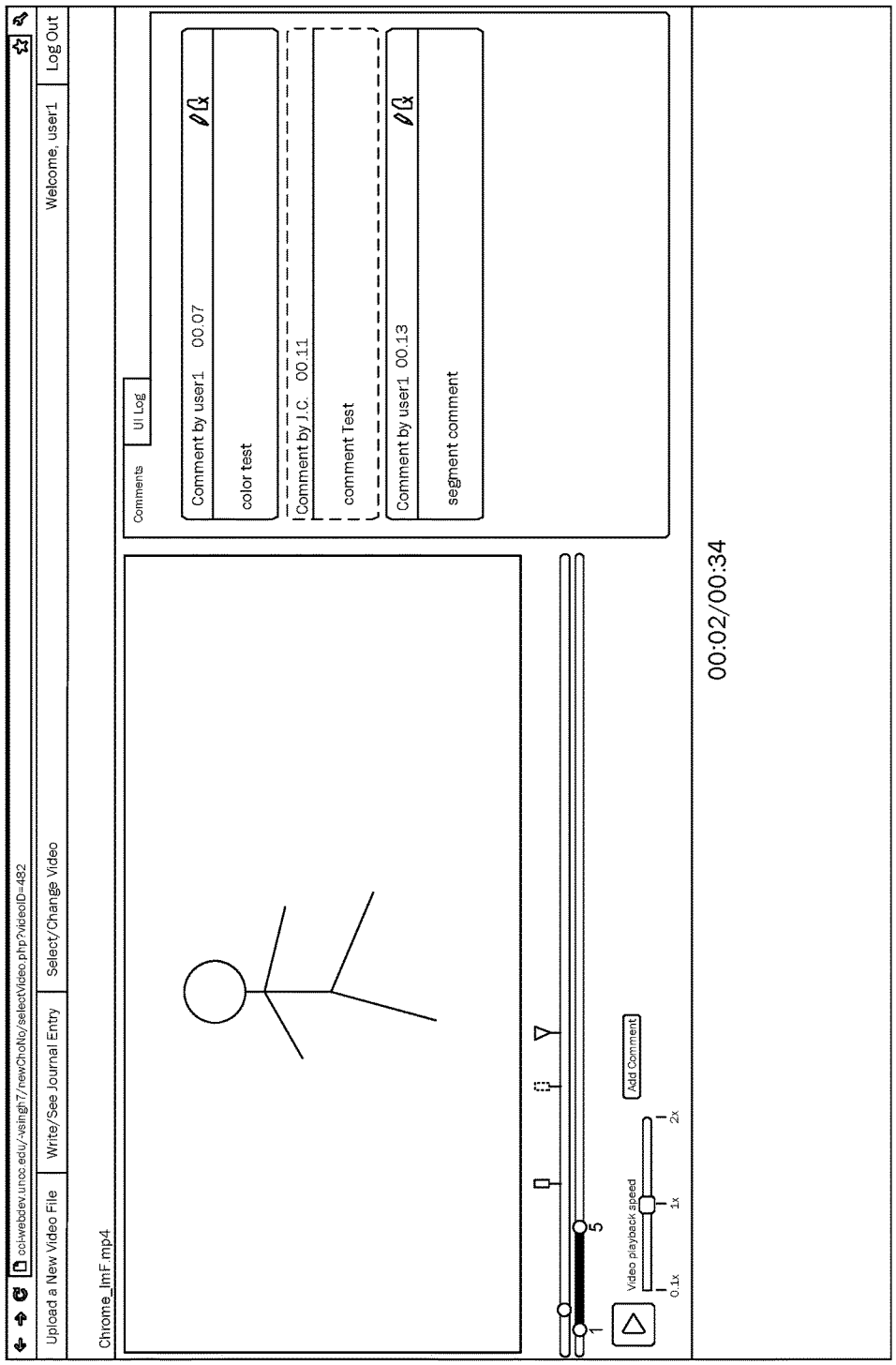
Figure 8E:
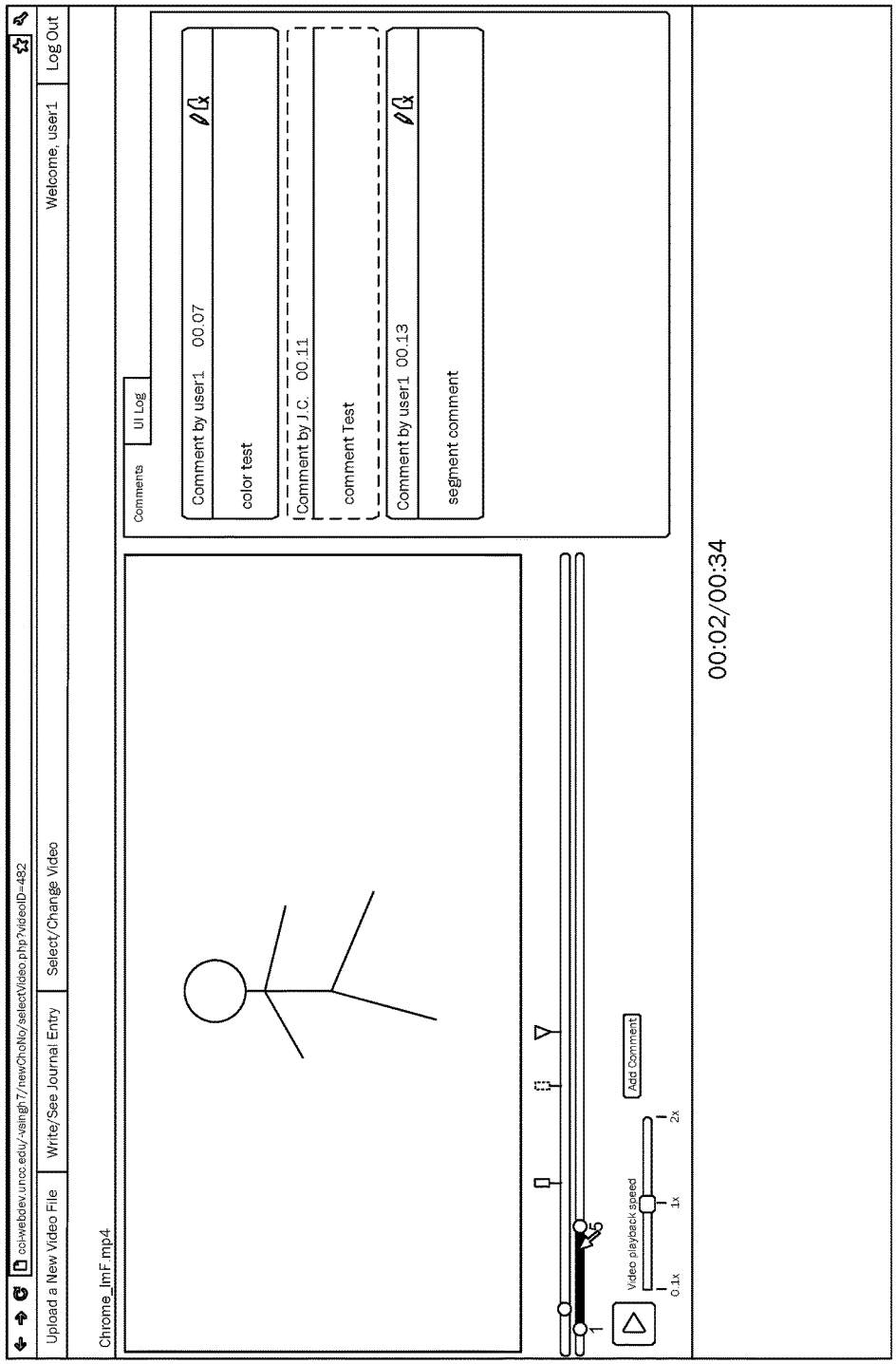
Figure 8F:
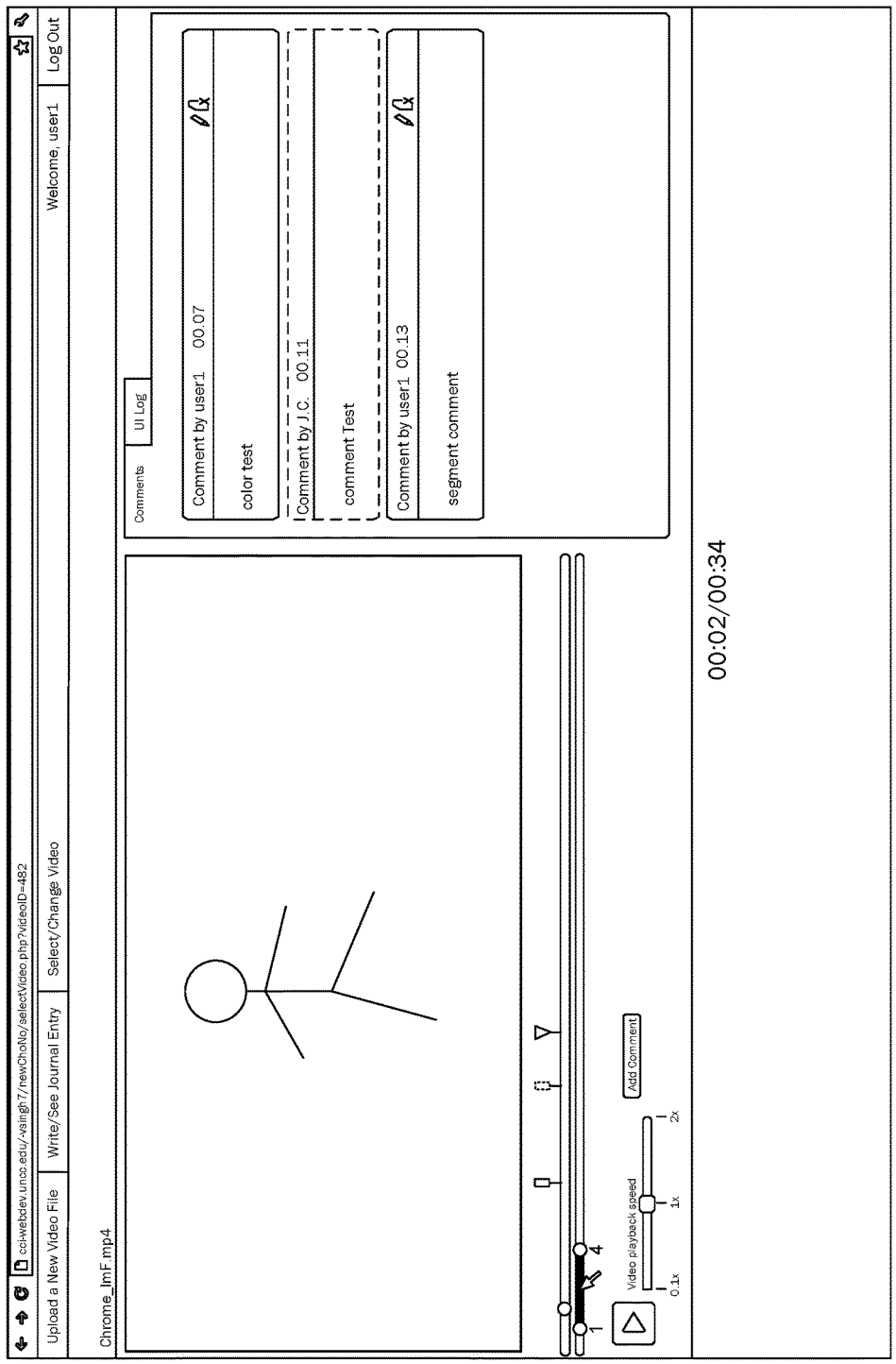
Figure 8G:
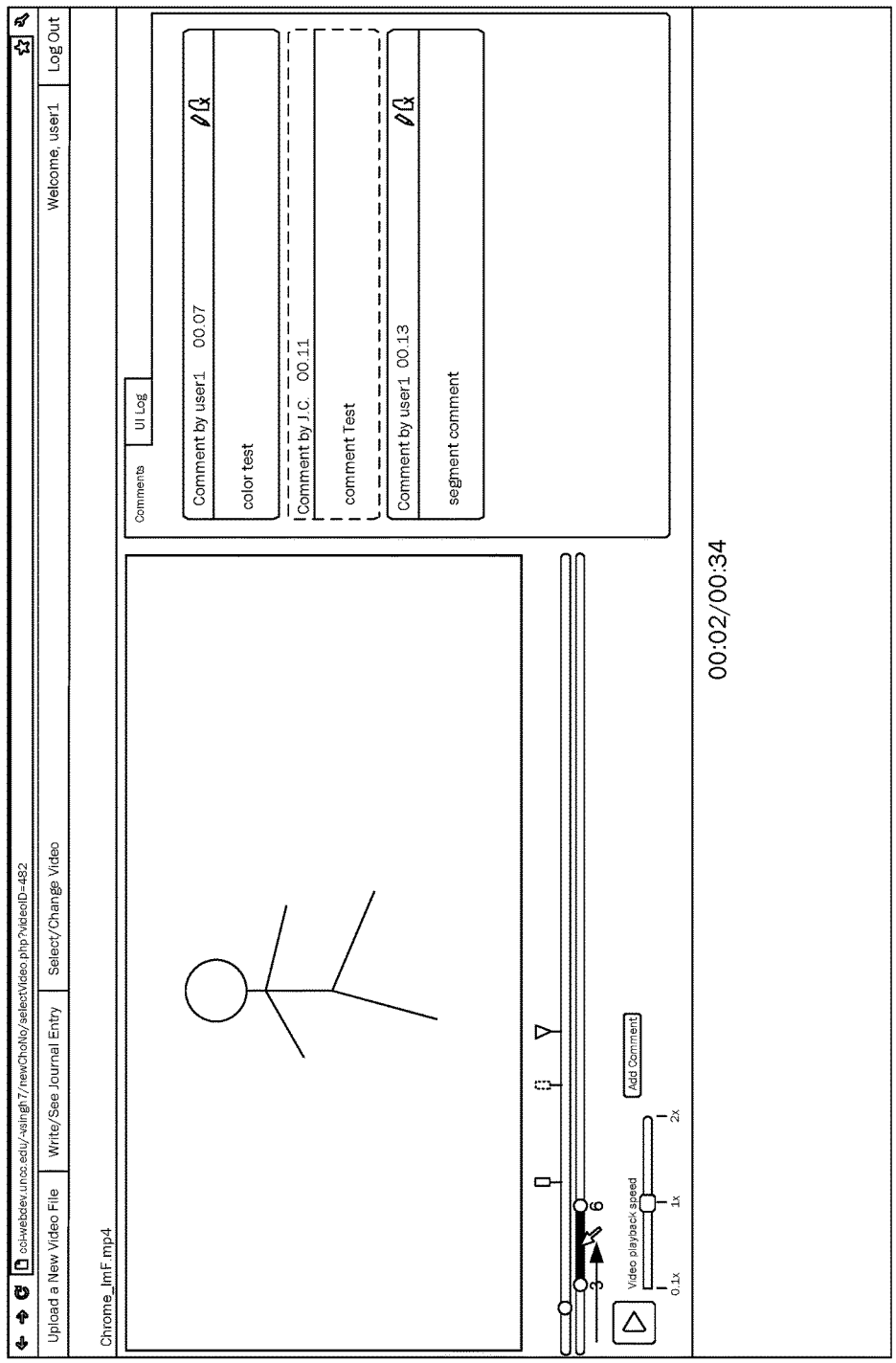
Figure 8H:
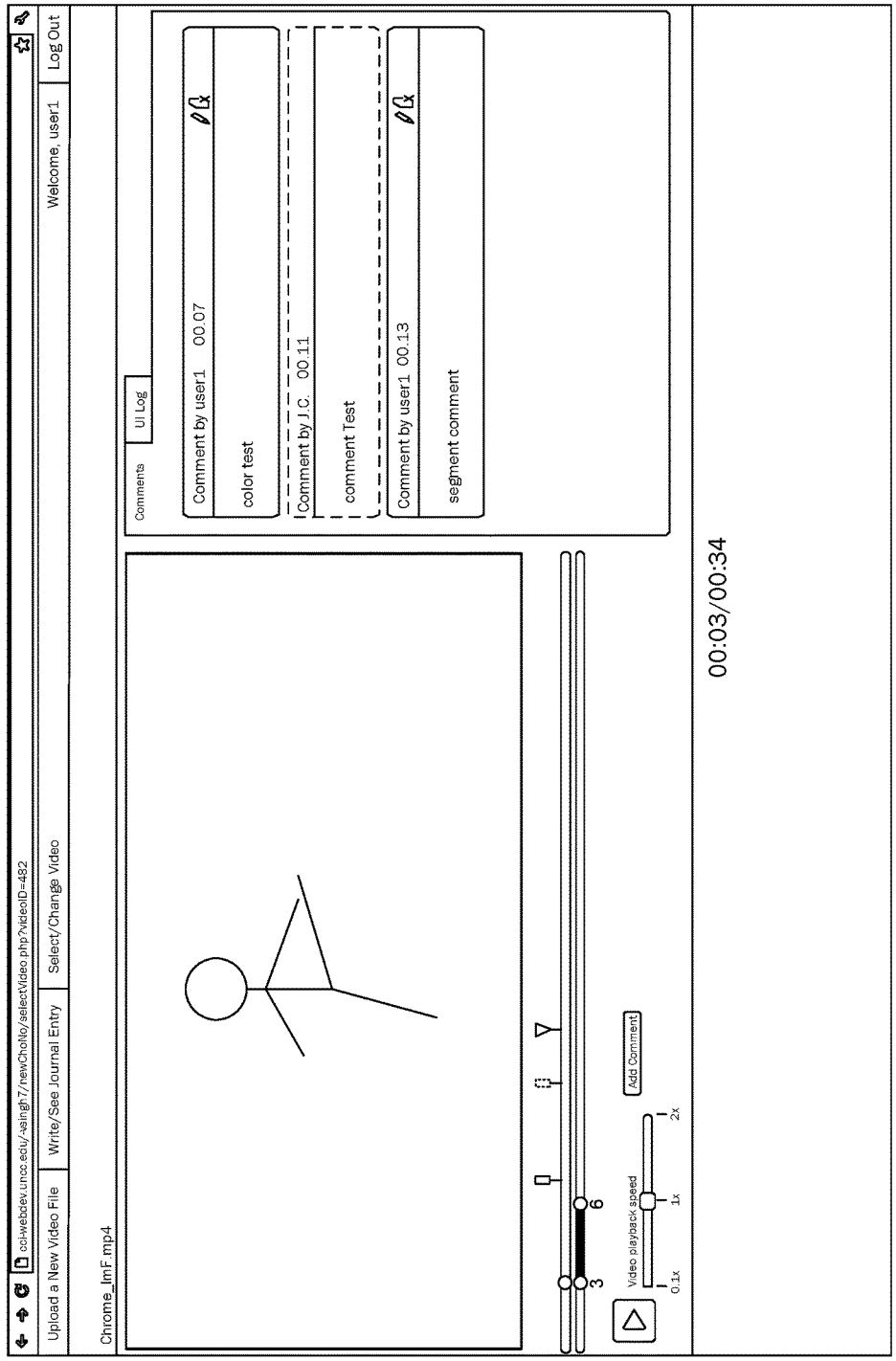

In one or more preferred implementations, once a segment is defined, a user can easily perform various operations to manipulate the segment. For example, a user can extend the segment by clicking on the segment timeline bar outside of the segment, in which case the handle closest to the point on the segment timeline bar the user clicked is moved to the point the user clicked, as illustrated by reference to FIG. 8C (illustrating where a user clicks with his or her mouse cursor), and FIG. 8D (which illustrates the change to the segment following such user click). Similarly, a user can shorten the segment by clicking on the segment timeline bar inside of the segment, in which case the handle closest to the point on the segment timeline bar the user clicked is moved to the point the user clicked, as illustrated by reference to FIG. 8E (illustrating where a user clicks with his or her mouse cursor) and FIG. 8F (which illustrates the change to the segment following such user click). Further, a user can drag a defined segment across the segment timeline bar, in effect moving the start and end points of that segment, but keeping the same segment length, as illustrated by reference to FIGS. 8G-8H. Further still, a user can deselect the segment, and select the entire video, by either moving the handles to the start and end points of the video, or can select the entire video (automatically moving the handles to the start and end of the video) by double clicking anywhere within the segment.

Using the video annotation interface, comments can be inserted on the video timeline bar in a plurality of different modalities by clicking the comment button. Once a user chooses to insert a comment, he or she can choose between text, sketch, voice, video, or any combination of these modalities. Sketch commenting preferably supports multi-color sketching with at least two different pen widths. Preferably, a user has the option of clearing the canvas if he or she is not satisfied with his or her sketch. Video commenting can utilize a web-cam to capture a video comment of the user, or can utilize an existing file as a video comment.

Once a comment is submitted, it is added to the comment display pane and one or more markers (such as, for example, a color-coded circle, rectangle, or triangle) appears over the video timeline bar showing the position of the inserted comment in the video.

In preferred implementations, posted comments can be associated with either a single point in time (or frame) of a video, or with a longer segment of a video. The former can be characterized as point comments, and might be represented by a first type of marker (such as, for example, a single colored rectangle) and stored in association with a single point in time, or frame, while the latter can be characterized as segment comments, and might be represented by a different type of marker (such as, for example, a colored triangle denoting a start of the segment, or even a pair of colored triangles denoting a start and an end of the segment), and stored in association with a start and end time, or start and end frames. Preferably, a user can add a point comment by clicking on the comment button while no segment is selected (that is, the entire video is selected for playback), as illustrated (starting from the situation in FIG. 7C) in FIGS. 9A-H, and can add a segment comment by clicking on the comment button while a segment is selected, as illustrated (starting from the situation in FIG. 8H) in FIGS. 10A-B.

Figure 9A:
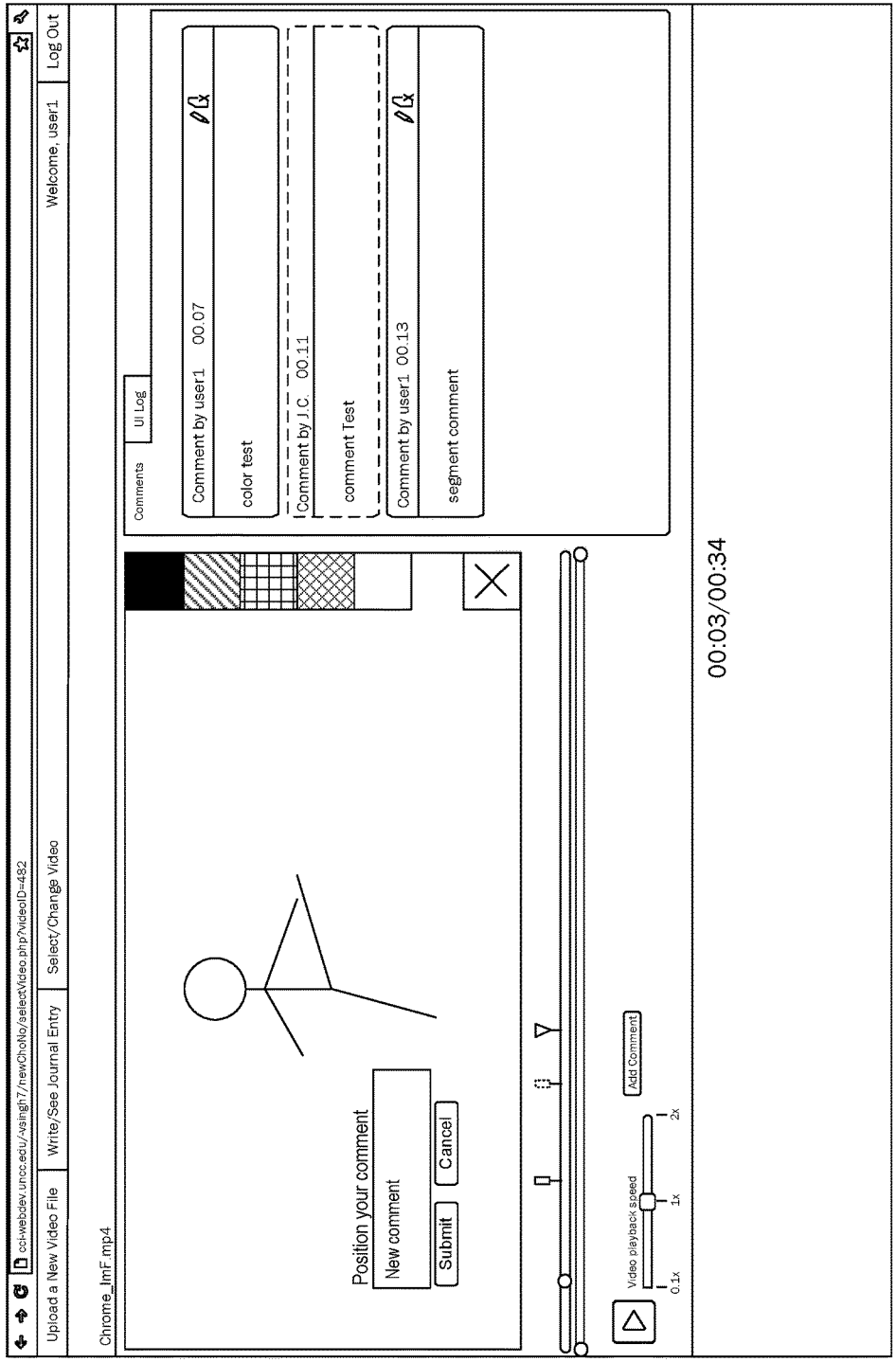
FIGS. 9A-I and 10A-B illustrate commenting functionality of the video annotation interface of FIG. 6.
Figure 9B:
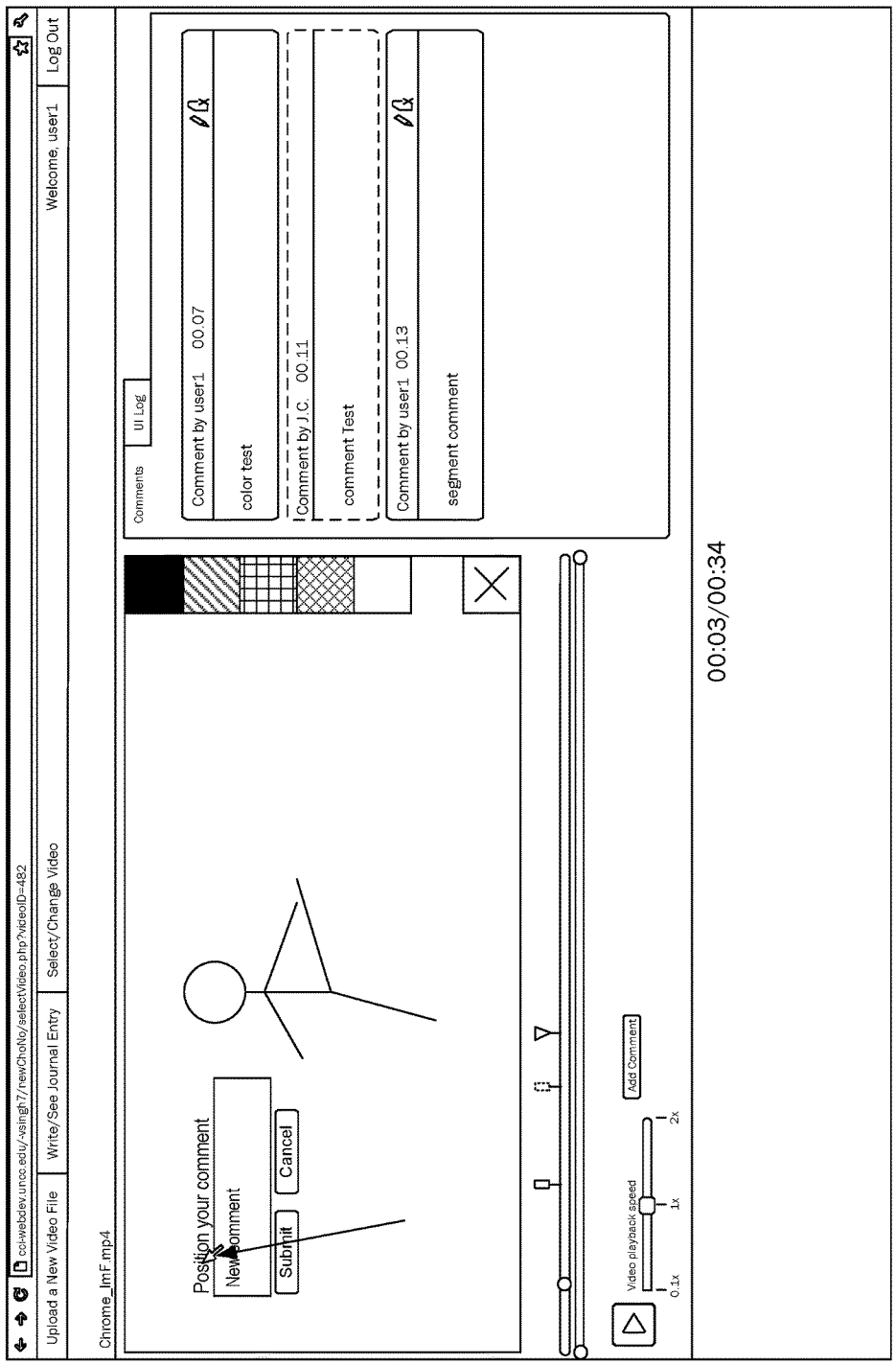
Figure 9C:
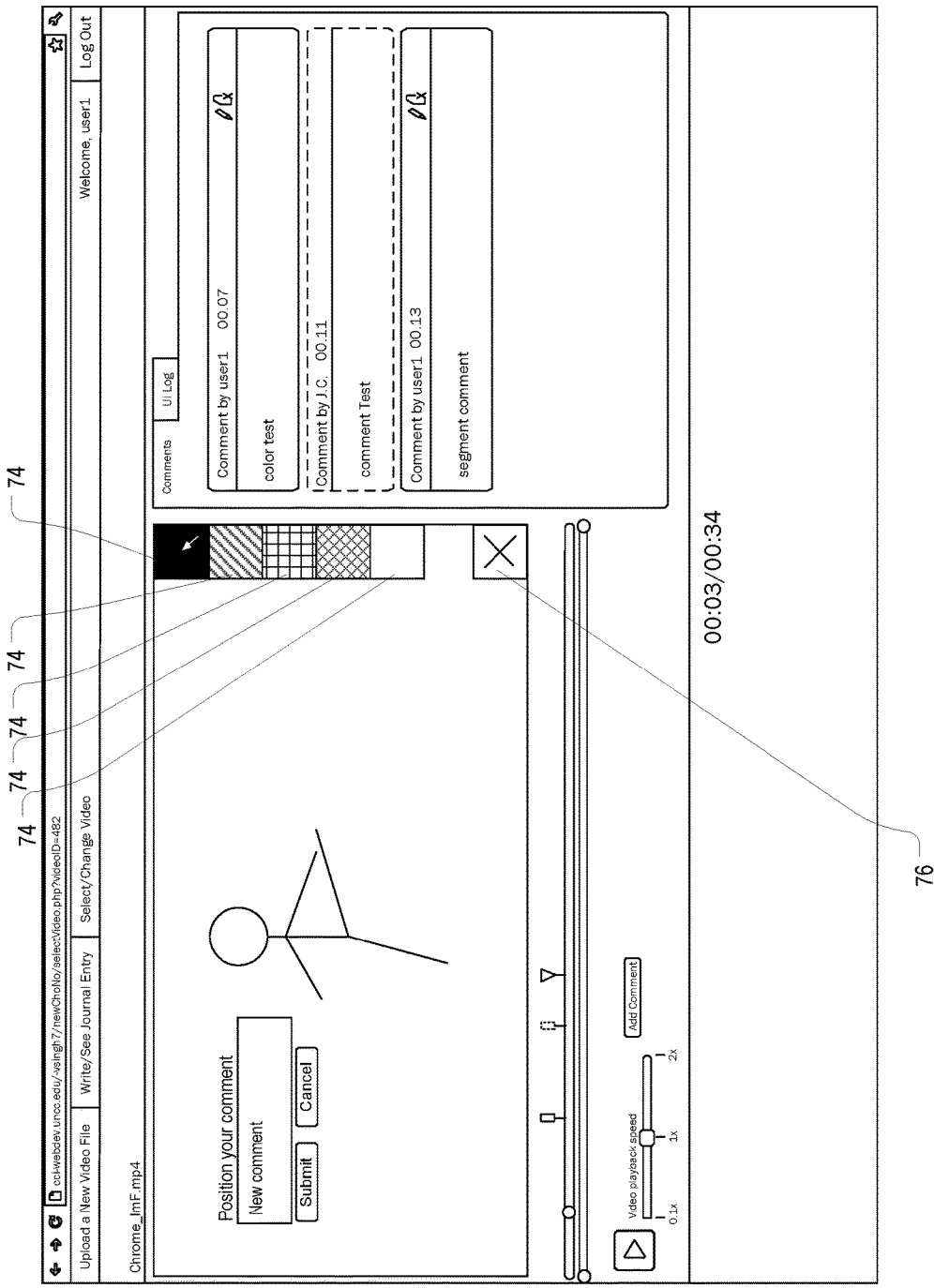
Figure 9D:
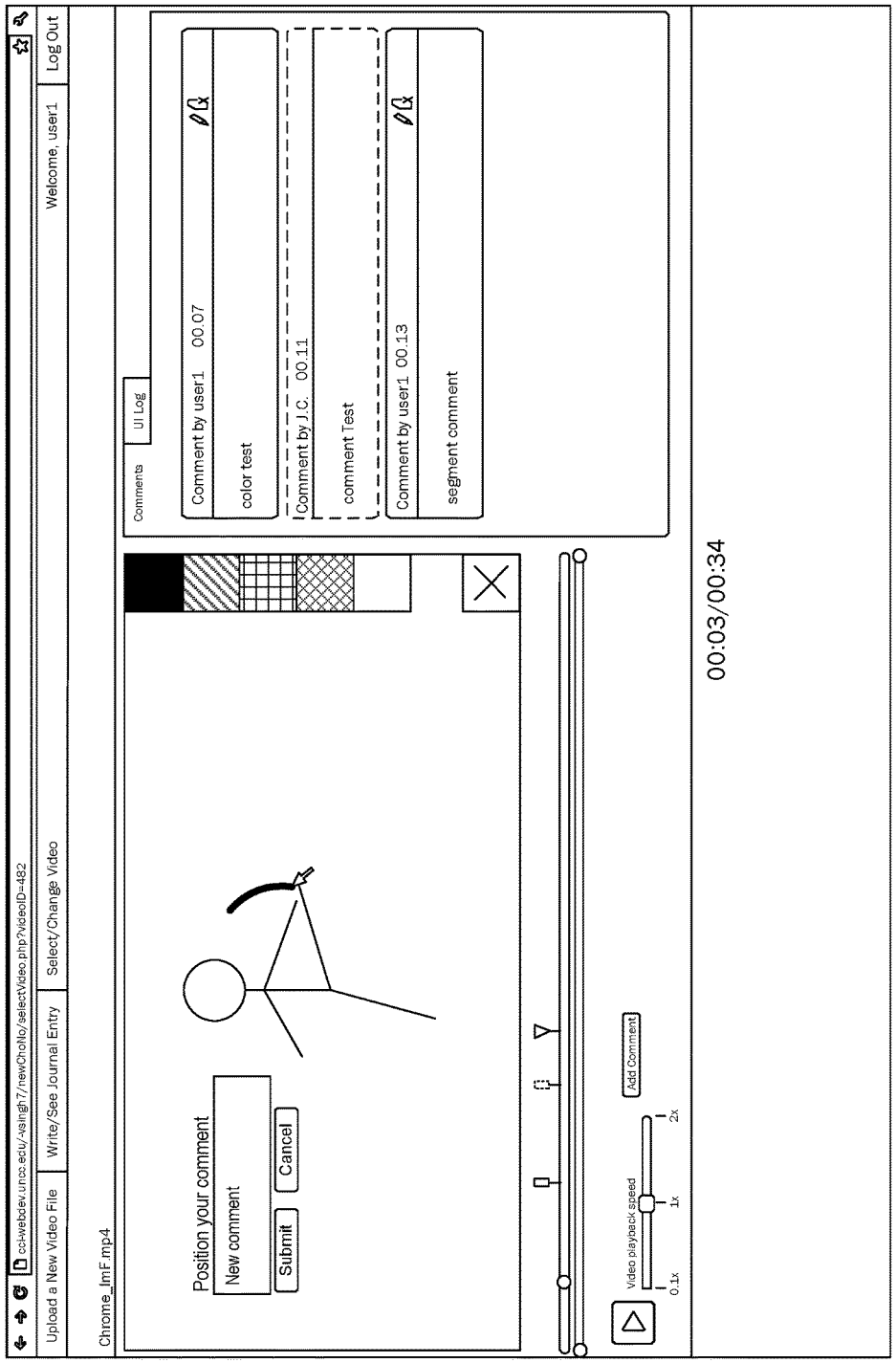
Figure 9E:
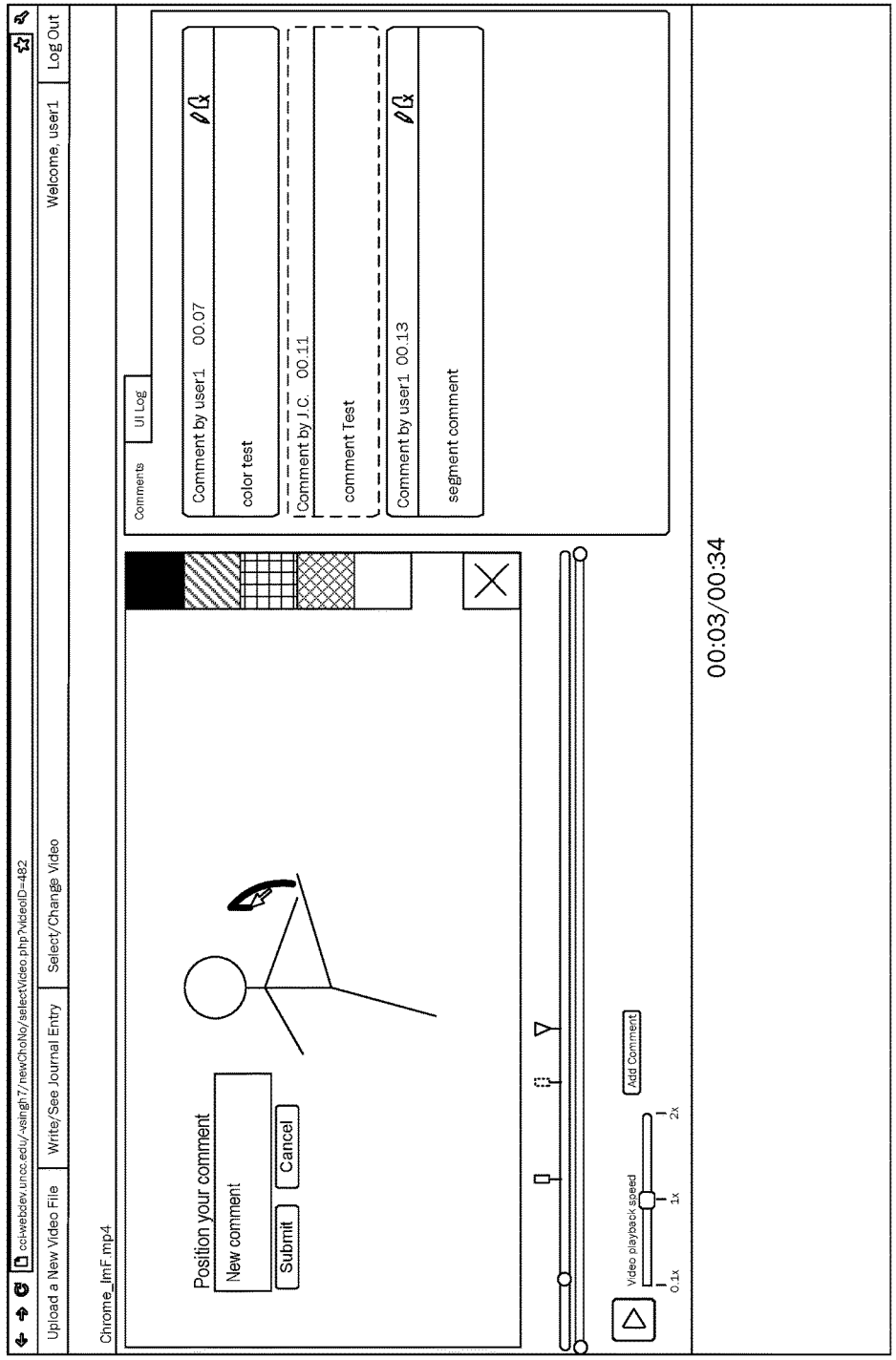
Figure 9F:
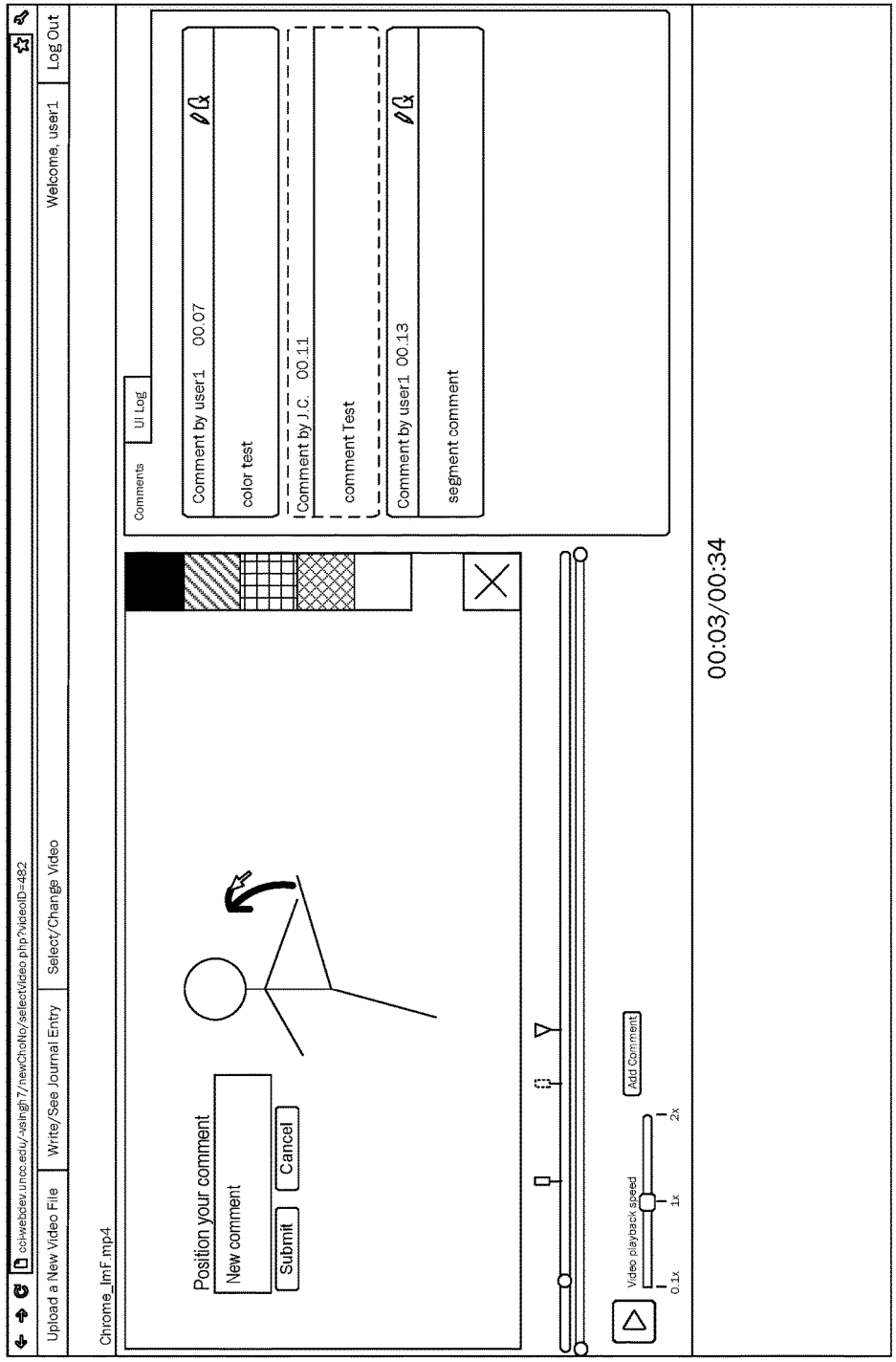
Figure 9G:
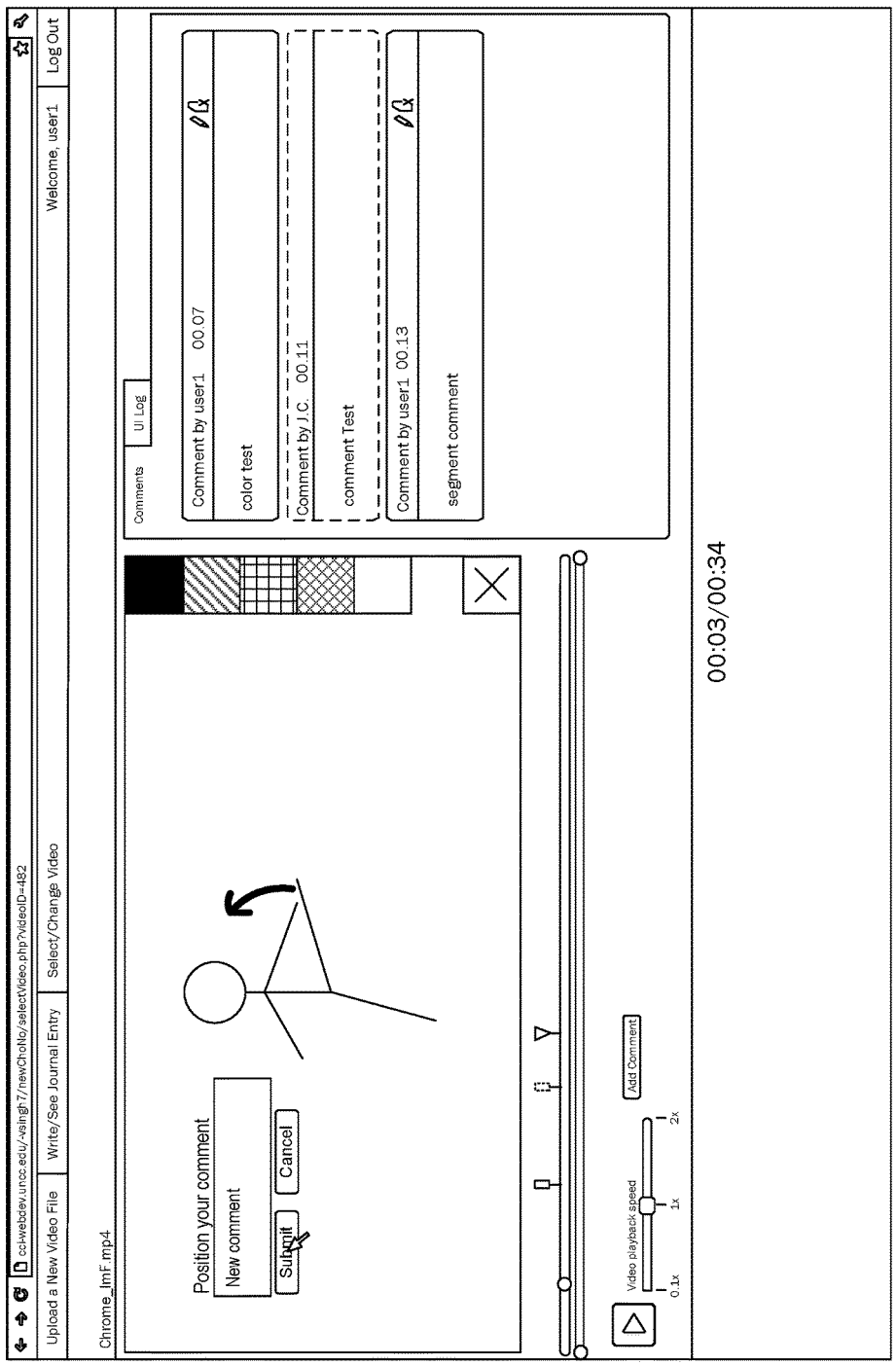
Figure 9H:
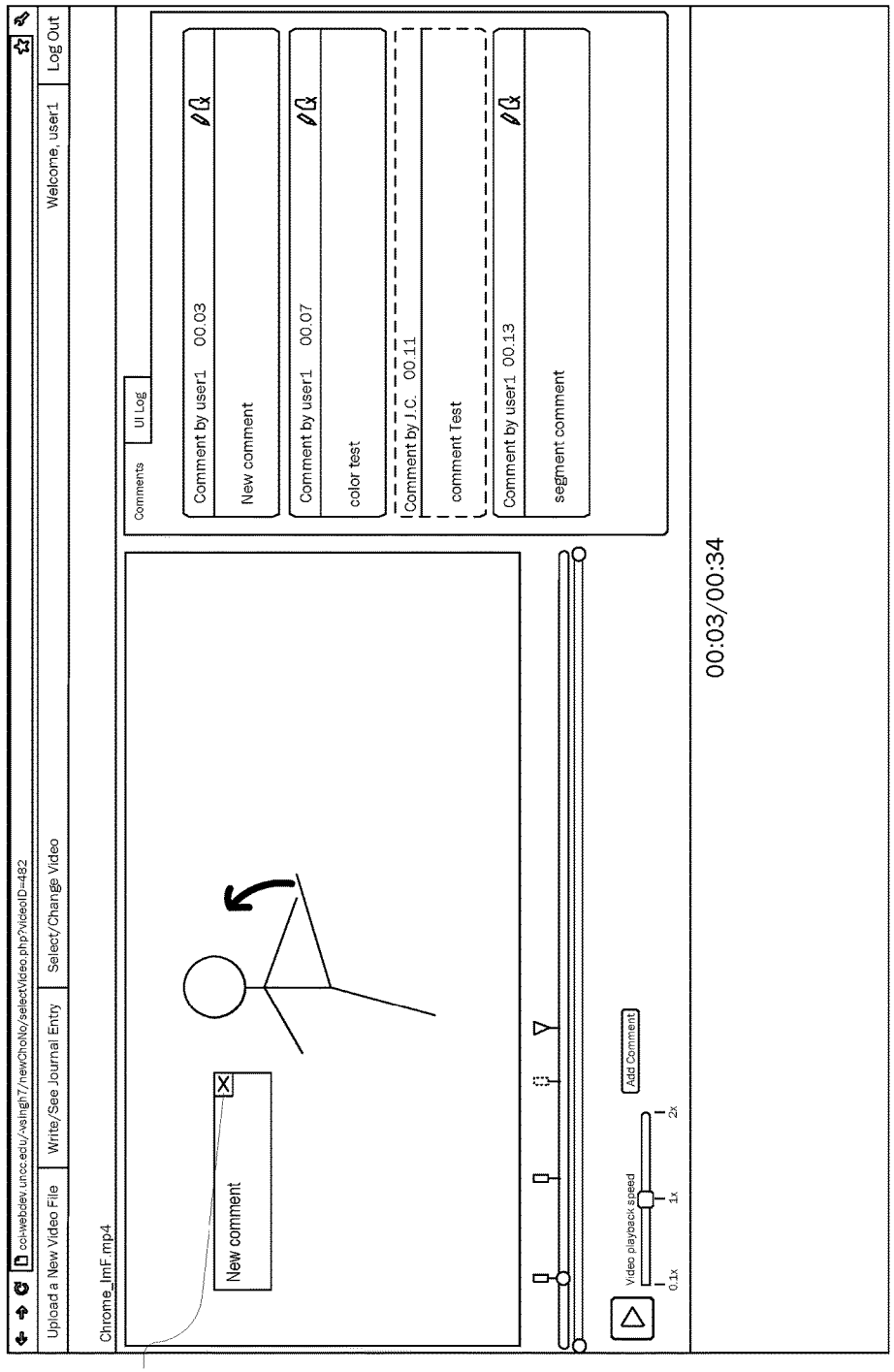
Figure 9I:
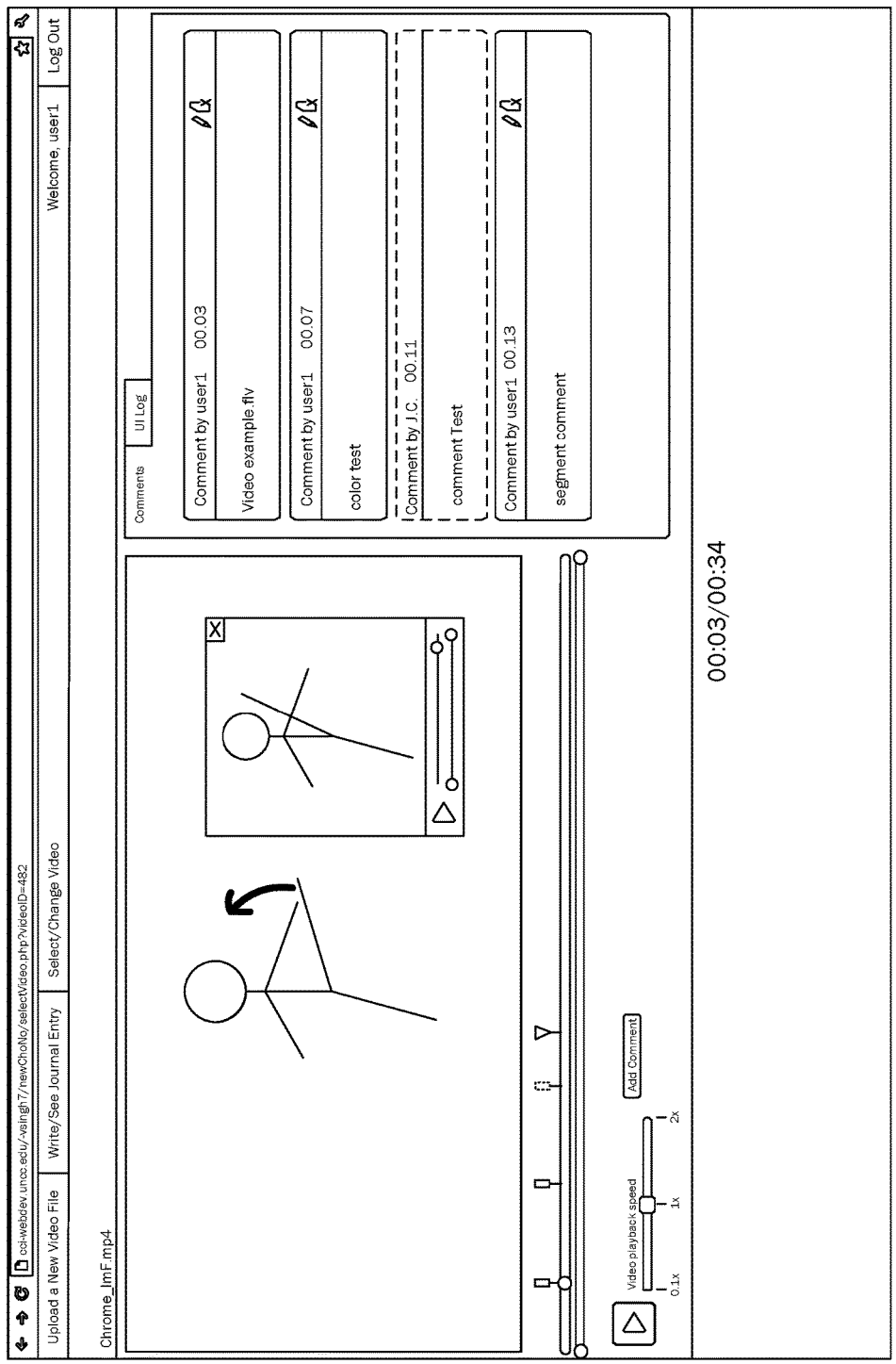
Figure 10A:
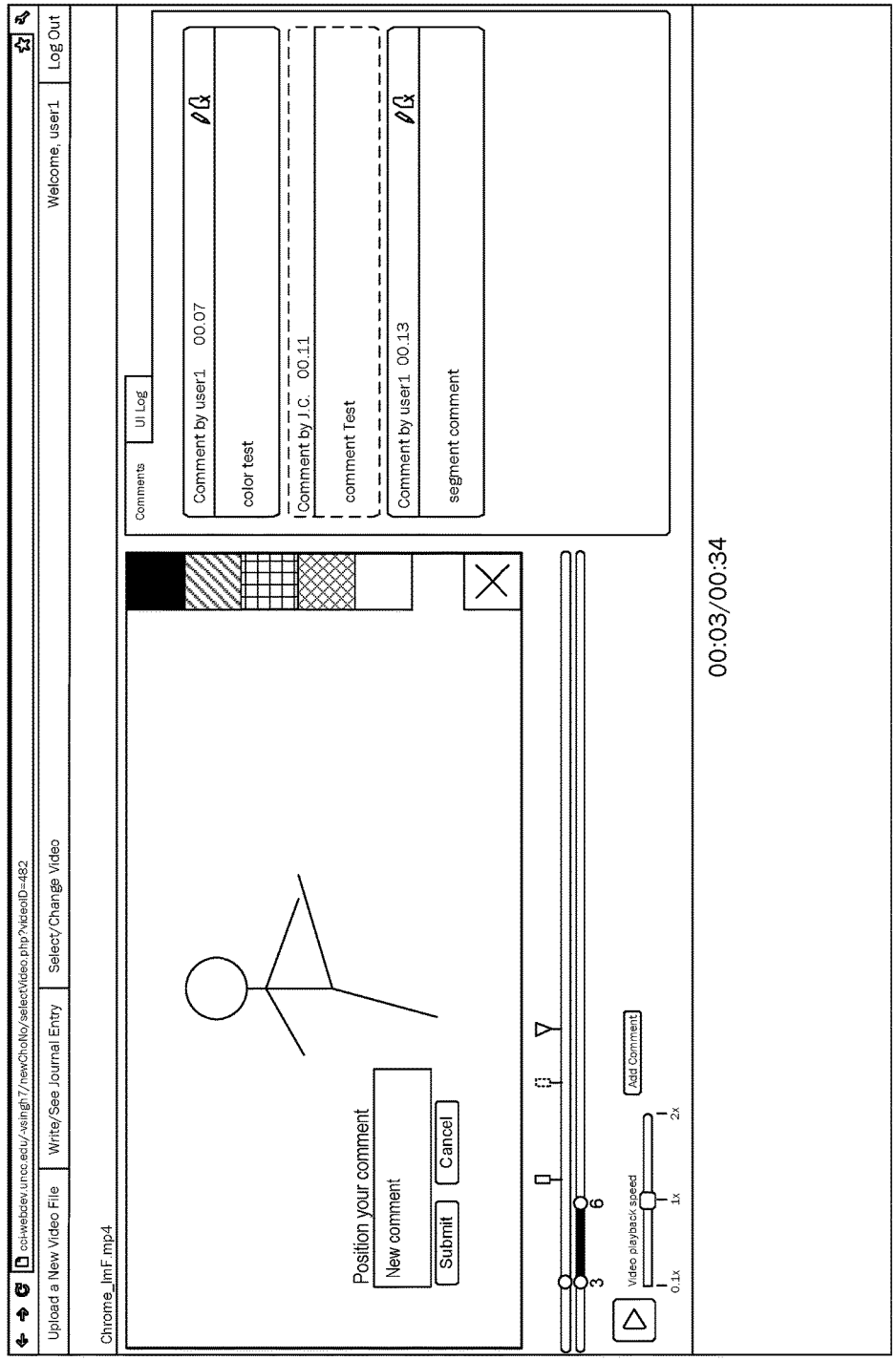
Figure 10B:
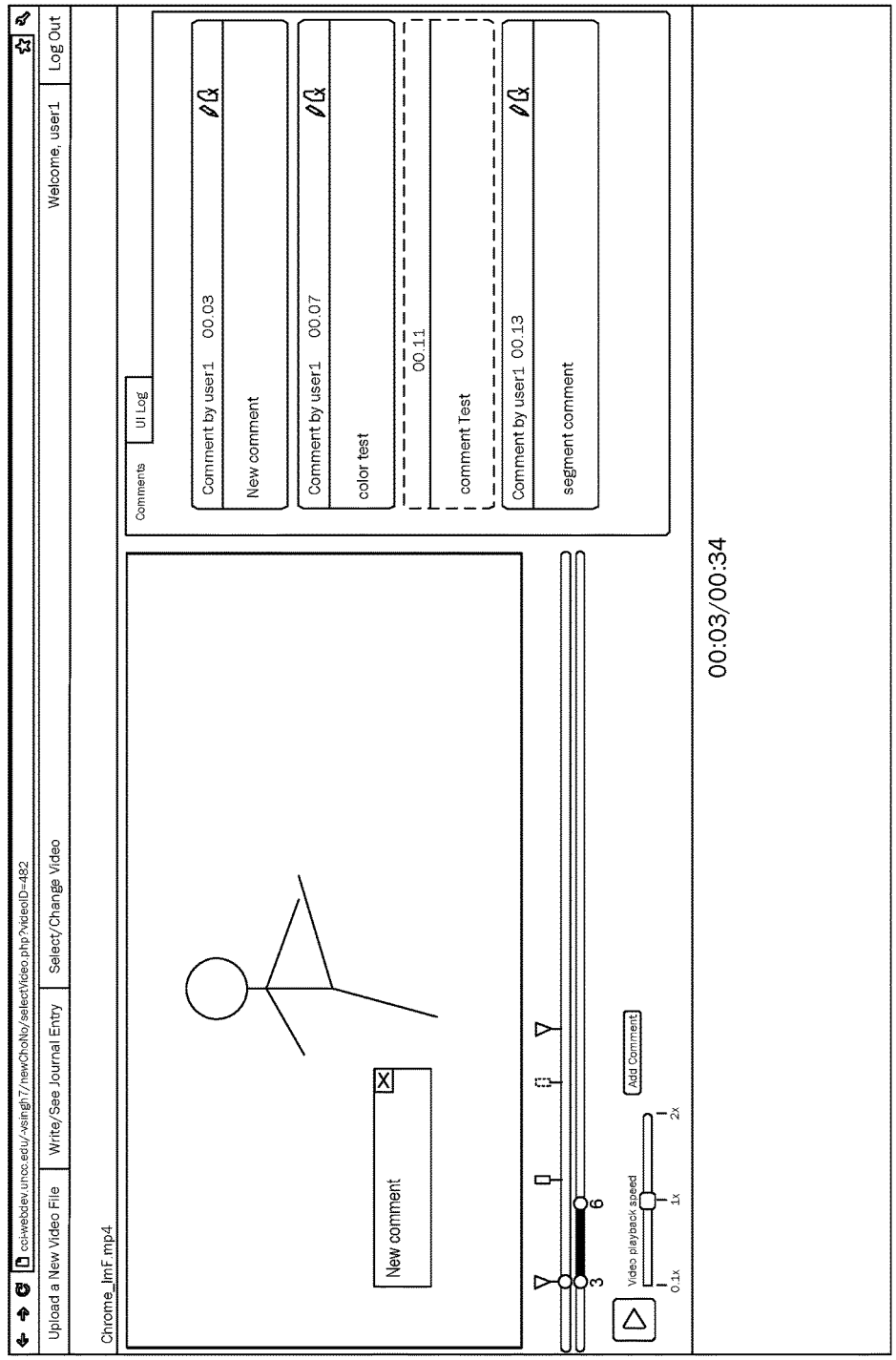

In the case of text (and, in at least some implementations, video) comments, a user can choose to move around the comment to overlay a different portion of the video, as illustrated via reference to FIGS. 9A-B; the position of the comment is preferably saved such that the comment is presented to other users in that same position. A user who originally posted a comment is preferably able to later edit, move, or delete such a comment, and other users may be able to do so as well if they enjoy sufficient permissions. Additionally, all users are preferably able to hide a displayed comment using an close button 72, which is illustrated in FIG. 9H. FIG. 9I illustrates similar display of a video comment (which video comment may be displayed with its own video timeline bar and segment timeline bar, as illustrated).

Preferably, each user's comments are color-coded, which can help in visual identification of comments while navigating.

FIG. 9B illustrates an exemplary comment addition interface which is provided once a user presses the comment button. The comment addition interface allows a user to input a text comment, move the position of that text comment relative to the video, select a color to use to annotate the video with using a plurality of displayed color boxes 74 (which can perhaps best be seen in FIG. 9C), annotate the video by drawing directly on the video using the selected color, and clear the canvas of any drawn annotations (which may include multiple drawn annotations in multiple colors) using a clear button 76 (which can perhaps best be seen in FIG. 9C). In at least some preferred implementations, the comment addition interface additionally allows a user to record a video or audio comment (e.g. utilizing a microphone and/or webcam), or upload such a video or audio comment (e.g. by selecting a file for upload).

When a user watches a video, he or she can choose to display all comments (such as by utilizing a "Show all Comments" checkbox) during playback, in which case the comments associated with that video are displayed during playback. In at least some implementations, video playback is paused when a point (and/or segment) associated with a comment is reached. In at least some implementations, even though point comments are only associated with a single point in time, they may be displayed for a longer duration, such as, for example, for a period of time prior to and/or subsequent to the point in time they are associated with, which period of time may be preconfigured and/or determined/modified based on an overall length of the video.

Posted comments can preferably be explored several other ways as well. A user can click on any comment in the comment display pane, or, alternatively, can click on a marker on the video timeline bar 20.

In either of these cases, when a user has selected a point comment, the video play-head 22 is either set to the point in time associated with the comment (which can be characterized as a cue-point), or else to a point in time prior to the cue-point (which might be a predefined amount of time before the cue-point, and/or might be calculated based on the overall length of the video), the video is paused (although in at least some implementations it may not be), and any comments related to that cue-point are overlaid over the video. In one or more preferred implementations, segment functionality of the segment timeline bar 30 is utilized when a point comment is selected to automatically define a segment around the point associated with the comment, the handles 32,34 of the segment timeline bar being automatically moved to define a segment having a length that might be predetermined or preconfigured (such as, for example, four seconds), or might be calculated or determined (such as, for example, based on a total length of the video). In at least some implementations, different types of comments may trigger different treatment; for example, a video may be paused at a particular frame associated with a drawing if a drawn annotation is present, but may be paused and/or looped through a four second segment if a text comment is present.

Similarly to some implementations of point comments, if a user has selected a segment comment, the initial and final handles 32,34 are set to the positions associated with that segment comment, the play-head 22 is moved to the position corresponding to the initial handle 32, the video is paused (although in at least some implementations it may not be), and the comment is displayed (other comments falling within that segment may or may not be displayed during playback).

Allowing a user to click on a comment and have a portion of the video associated therewith played back (together with the comment) delivers comments in context, which makes it easy for users to correlate comments with the portion of the video. For example, dancers watching a video can easily correlate comments with their movements.

In one or more preferred implementations, a user can hover a cursor over a comment marker, and a preview of the comment (preferably with a frame of the video the comment is associated with) is displayed. For example, a preview may be displayed in the video pane in the form of the frame the comment is associated with and the comment in its position relative to the video, and/or a preview may be displayed in the form of the comment displayed above the comment marker.

Additionally, in one or more preferred implementations, when a user hovers over a segment comment marker, the portion of the video corresponding to that segment is highlighted, for example on the segment timeline bar or the video timeline bar.

Figure 11:
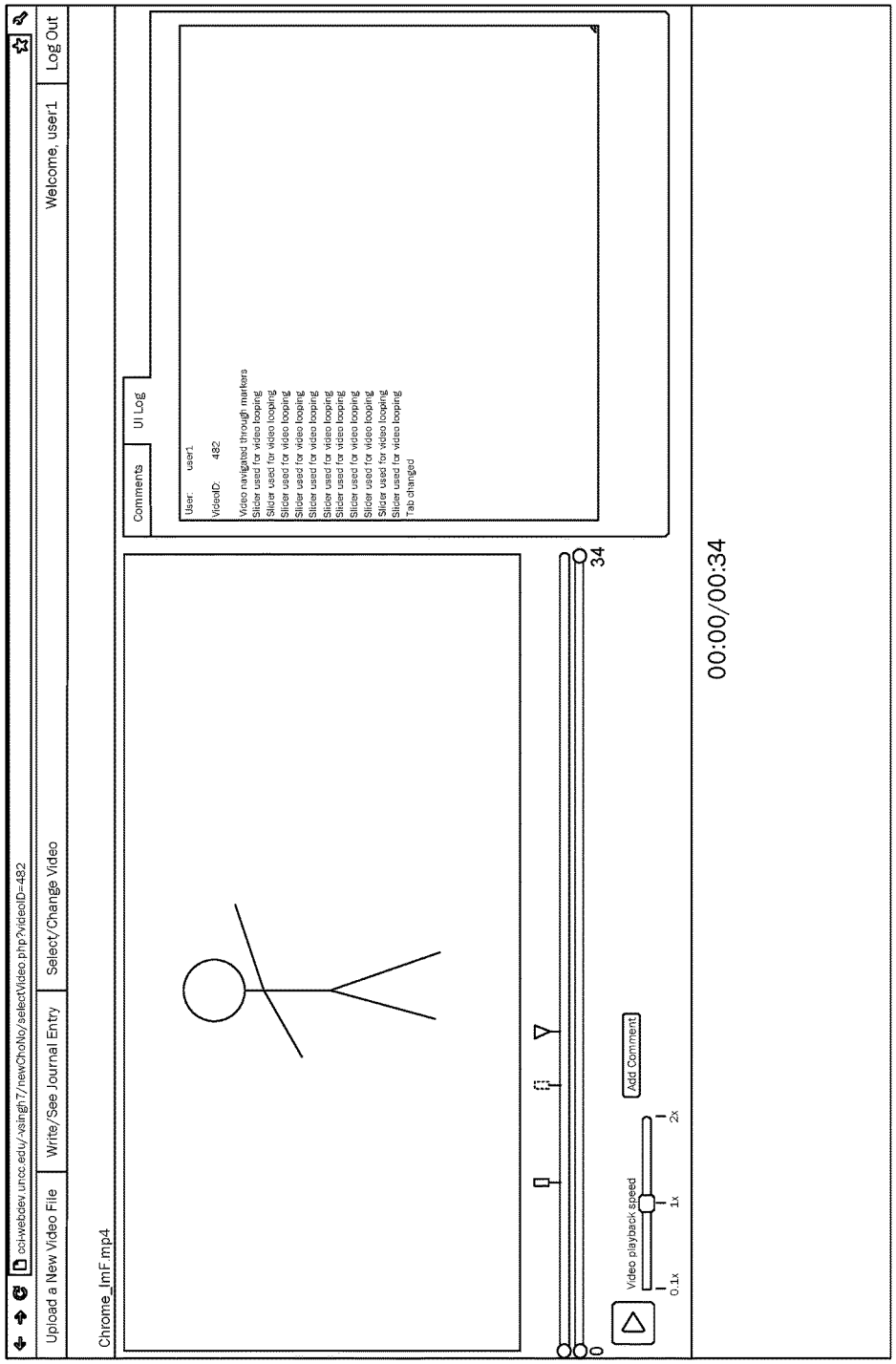
FIG. 11 illustrates a change log pane of the video annotation interface of FIG. 6.

As noted hereinabove, the video annotation interface includes a change log pane which is configured to track changes and/or user interaction with the application. The application preferably includes self-documenting archival functionality which logs, for example, the creation, editing, and deletion of comments. Such changes are displayed in the change log pane, and in one or more preferred implementations, the application allows changes to be undone. Additionally, the application preferably logs other types of user interaction with the video annotation interface as well, as illustrated in FIG. 11.

Figure 12:
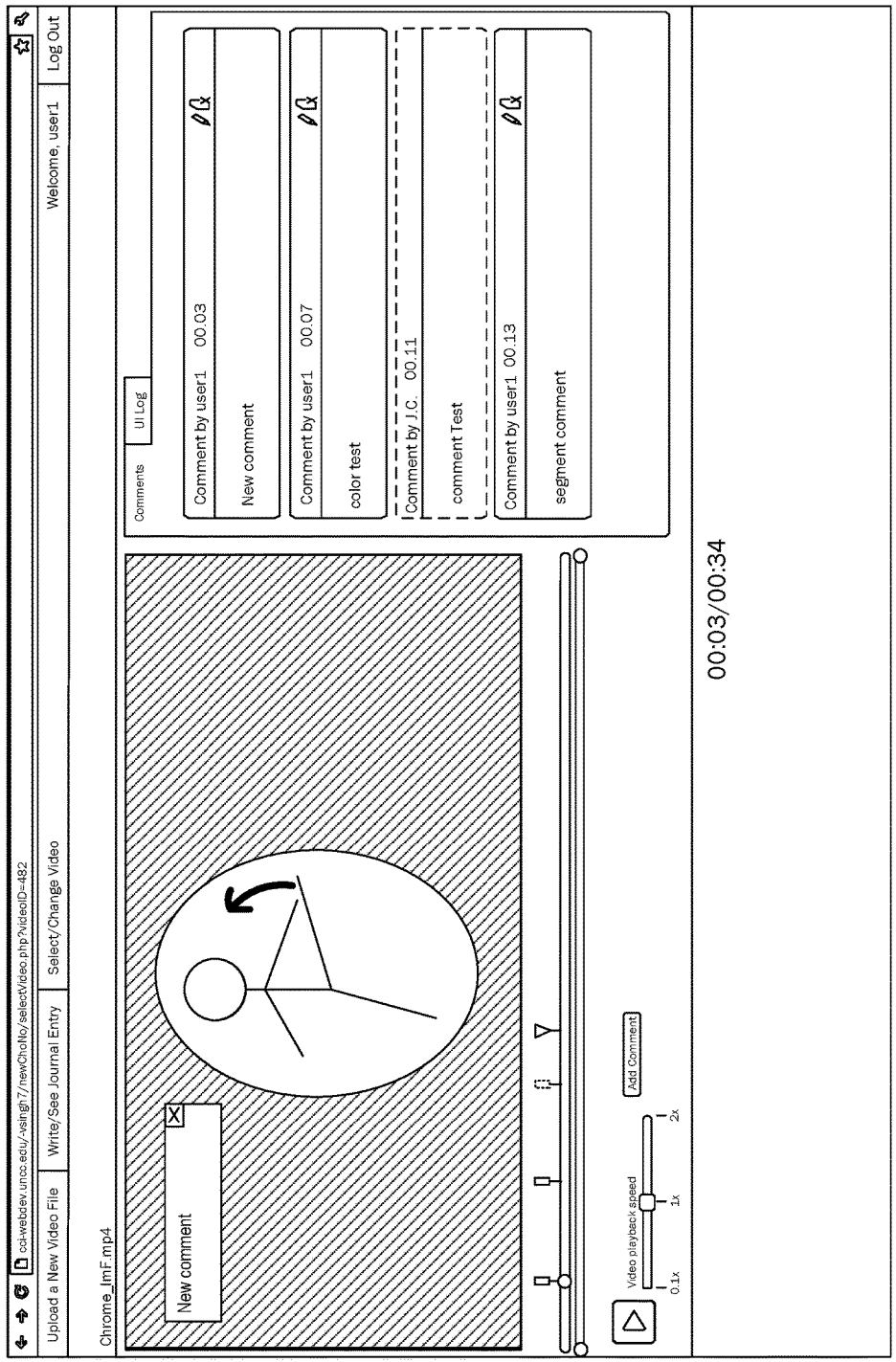
FIG. 12 illustrates focus area functionality of a video annotation interface.
Figure 13:
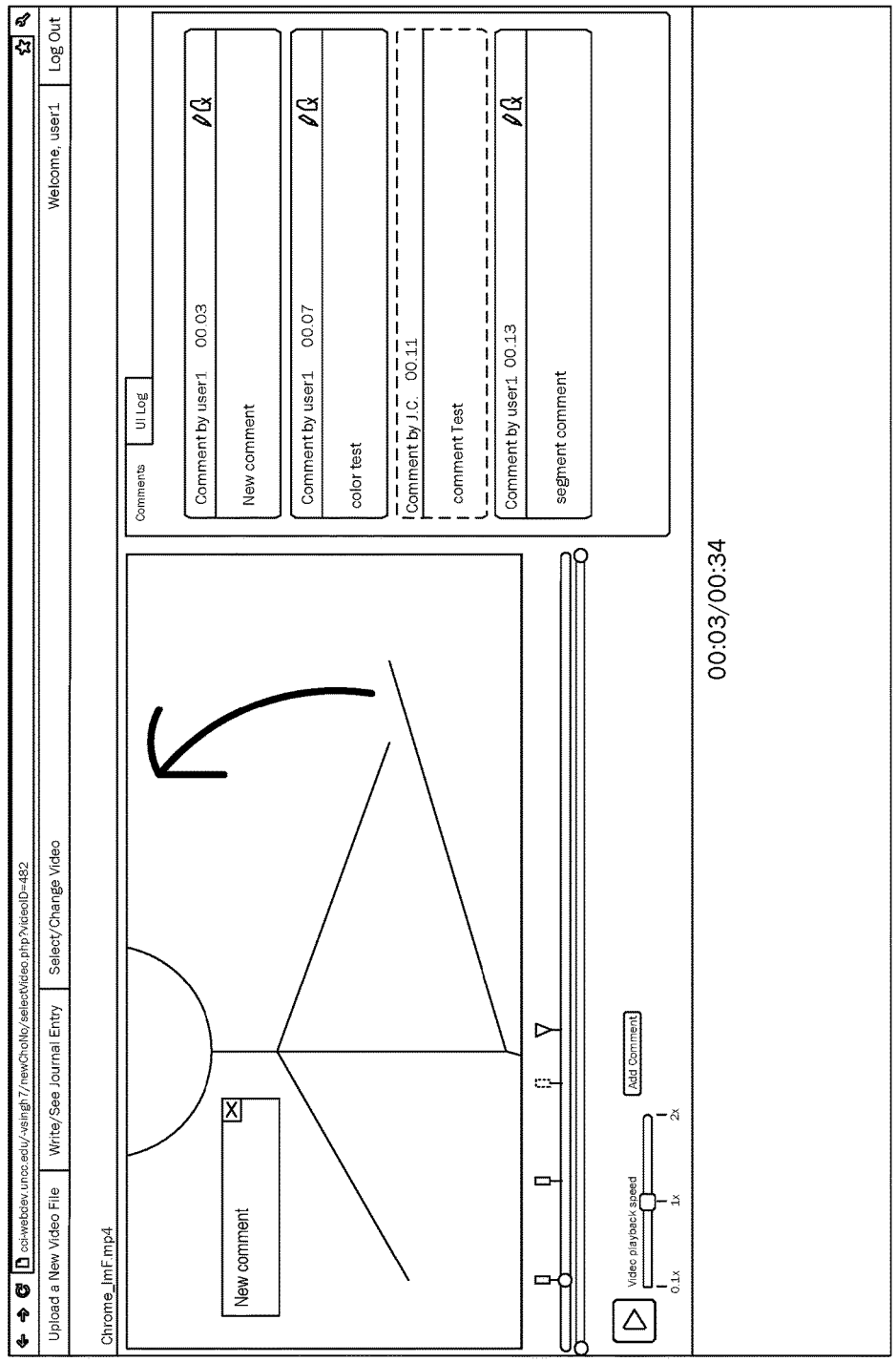
FIG. 13 illustrates zoom functionality of a video annotation interface.

In one or more preferred implementations, the video annotation interface includes focus area functionality which allows a user to define a focus area for a comment, such as, for example, a rectangular, circular, or irregularly shaped (and user defined) focus area which corresponds to a portion of the video the user wants other users to focus on when reviewing his or her comment. Such a focus area may be defined by drawing a particular shape on the video pane, and/or by cropping out an area of the video pane. In some preferred implementations, during playback of frames of the video associated with the comment having a defined focus area, the portions of the frames outside of the defined focus area are grayed out, as illustrated in FIG. 12. Similarly, in at least some implementations, the video annotation interface allows a user to define a zoom area, and the frames of the video associated with the zoom area are displayed zoomed in on the zoom area when the comment is selected for playback, as illustrated in FIG. 13 (and, in at least some implementations, during normal play back too if all comments are selected for display, although in at least some implementations zooming may not be enabled in such situations).

In one or more preferred implementations, the video annotation interface provides the ability to define a measurement scale and take measurements based on such scale. An exemplary such methodology involves allowing a user to first establish a baseline measurement by drawing a line segment over the video pane that corresponds with a certain displayed element and enter a measurement corresponding to that displayed element and line segment. For example, if a user knows that the beak of a particular bird displayed in a video is 3 cm, then a user can draw a line segment over the beak and input 3 cm (preferably, the application alternatively allows for simple entry of a ratio, for example, if a user knows that 10 cm onscreen corresponds to 3 cm in the video, the user can simply enter that ratio). Thereafter, the user can draw additional line segments over frames of the video and the application will calculate, based on the scale defined by the 3 cm beak, the relative length of whatever is displayed in the video based on the drawn line segment. In a preferred implementation, this is calculated as a simple ratio; for example, a 10 cm line segment that is drawn by a user and indicated to correspond to a 3 cm beak could be used to determine that a 20 cm line segment drawn by the user corresponds to 6 cm in the video using the simple ratio: $10/3=20/x$, or $x=(20*3)/10$.

The video annotation interface includes a playback speed slider, which allows a user to control a playback speed of the video. The playback speed slider preferably includes a selection handle which a user can slide along to vary the playback speed. Preferably, the playback speed slider enables slow motion playback, that is, play back of a video at a slower rate than its normal speed. In preferred implementations, a normal playback speed is roughly 30 frames/second, so reducing a playback speed could, for example, effect playback in slow motion at a speed of 20 frames/second, 15 frames/second, 10 frames/second, 5 frames/second, etc. In a preferred implementation, the playback speed slider control can vary the playback speed from 0.1× to 2×, with a midpoint of the slider control corresponding to normal speed (1×), although in at least some other implementations these values may be different (and may even be user configurable). In one or more preferred implementations, a user can associate a point or segment comment with a particular playback speed so that the if a user later selects the comment, the portion of video corresponding to that comment will be played back at the associated speed. In one or more preferred implementations, this might be characterized as saving the state of a comment, such as the state of the playback speed slider.

In one or more preferred implementations, the application includes functionality which allows a user to automatically generate a comment with a single key press. For example, an ornithologist watching a video of a particular bird might want to annotate the video with bird behaviors that occur during the video, such as turning left, turning right, chirping, etc. In order to facilitate rapid annotation of these behaviors, the application is preferably configured to allow the user to automatically generate certain configured comments with a single key press, such as automatically generating and saving a "left turn" comment by pressing "L", or automatically generating and saving a "chirp" comment by pressing "C". Preferably, these configured automatically generated comments are capable of being user configured. In one or more preferred implementations, the application is configured to utilize key code (or key press) libraries which configure what keys will automatically generate what comment. For example, a key press library might comprise a comma separated values file in which each line includes an indication of a key (such as "C") and an indication of a comment to automatically generate (such as "chirp"). Such a file might additionally include an (x,y) position on the video to anchor the comment, and/or an indication of a segment to create based on the key press (for example, the file might indicate to create a segment starting x seconds before the point at which the key was pressed and ending x seconds after the point at which the key was pressed, where either or both x's might be zero). In one or more preferred implementations, an application might provide key code (or key press) library functionality by allowing a user to upload and/or load one or more key press files.

In one or more preferred implementations, the application includes a full screen mode which allows users to view a video in full screen mode. In at least some implementations, this full screen mode includes comment markers displayed proximate a top or bottom of the screen. Similarly, in at least some implementations, the full screen mode includes one or both timeline bars displayed proximate a top or bottom of the screen.

Although illustrated and described herein largely in the context of a computer application configured for use with a mouse and keyboard, in one or more preferred implementations the application is configured for use with a tablet or slate computer, such as an iPad, or a smart phone, such as an iPhone, Android, or Blackberry. In some preferred implementations, the application is configured to toggle between a normal mode and a full screen mode as an orientation of the device the application is running on is transitioned from a landscape orientation to a portrait orientation, or vice versa (e.g. based on accelerometer readings of the device).

In one or more preferred implementations, commenting is configured to allow users to respond to comments made by other users, and responsive comments may be grouped in various ways to indicate that they are responsive to a previous comment. For example, comments may form a comment thread, and/or may all be grouped together in a manner that pictorially or numerically indicates that multiple comments are grouped or associated.

In addition to allowing users to collaboratively comment on videos, the application preferably includes a journal which can be utilized by users. For example, choreographers and dancers often keep a journal documenting notes on their progress and ideas and images to be explored (in some production processes a journal is an explicit part of the development); the application includes journal functionality which can be used by choreographers or dancers to record and review private thoughts. So if a dancer got some instruction from a choreographer or if her or she made a mental note about something to remember, he or she can write it in his or her journal. A user can access this journal functionality anytime while using the application, once logged in, and preferably journal entries are private to a user and cannot be seen by other users.

Specifically, the application's navigation bar allows users to access a journal interface. FIG. 14 illustrates such journal interface. The journal interface allows a user to write and submit new journal entries, and review, edit, and delete older journal entries.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method comprising:
   (a) receiving, at an electronic device,
      (i) data corresponding to a video, and
      (ii) data corresponding to a plurality of point comments associated with the video, each of the plurality of point comments being associated with a single point in time and with a particular user account of a plurality of user accounts,
      (iii) data corresponding to a plurality of segment comments associated with the video, each of the plurality of segment comments being associated with a video segment representing a span of time of the video and with a particular user account of the plurality of user accounts;
   (b) displaying, to a user via an electronic display associated with the electronic device, a video annotation interface comprising
      (i) a video pane configured to display the video,
      (ii) a first video timeline bar including a video playhead indicating a current point of the video which is being played,
      (iii) a second segment timeline bar disposed below the first video timeline bar, the second segment timeline bar including initial and final handles configured to define a segment of the video for playing,
      (iv) a first plurality of point comment markers identifiable as point comment markers by the presence of a first geometric shape displayed in connection with the video timeline bar, each of the first plurality of comment markers corresponding to one of the plurality of point comments associated with the video,
      (v) a second plurality of segment comment markers identifiable as segment comment markers by the presence of a second geometric shape displayed in connection with the video timeline bar, each of the second plurality of comment markers corresponding to one of the plurality of segment comments associated with the video,
      (vi) a comment display pane displaying text corresponding to at least some of the plurality of comments associated with the video, and
      (vii) a comment control configured to allow the user to add a comment to the video; and
   (c) receiving, at the electronic device from the user, input corresponding to engagement at a first point on the segment timeline bar;
   (d) automatically, in response to receiving the input corresponding to engagement at the first point on the segment timeline bar, moving the initial and final handles of the segment timeline bar to define a first segment of a first length centered around the first point, wherein the first length is one of a preconfigured length and a length determined based on a total length of the video;
   (e) receiving, at the electronic device from the user, input corresponding to dragging of the final handle to change the length of the first segment to a second length;
   (f) receiving, at the electronic device from the user, input corresponding to dragging of the first segment on the segment timeline bar, and simultaneously moving the initial and final handles while keeping the first segment its current length in response thereto;
   (g) receiving, at the electronic device from the user, input corresponding to engagement of the comment control;
   (h) in response to receiving input corresponding to engagement of the comment control, displaying, to the user via the electronic display associated with the electronic device, a comment interface;
   (i) receiving, at the electronic device from the user, input corresponding to one or more desired annotations; and
   (j) in response to receiving input corresponding to one or more desired annotations,
      (i) associating the input one or more annotations with the selected first segment of the video,
      (ii) updating the video annotation interface so that the plurality of comment markers displayed in connection with the video timeline bar includes a new segment comment marker corresponding to the first segment, and (iii) displaying an indication of the input one or more annotations overlaid over the video in the video pane.

2. The method of claim 1, wherein the received data corresponding to a plurality of point comments associated with the video includes data corresponding to a particular point comment which includes an identification of a point of the video associated with the comment.

3. The method of claim 2, wherein the identification of a point of the video comprises a timestamp.

4. The method of claim 1, wherein the identification of a point of the video comprises a frame identification.

5. The method of claim 1, wherein the received data corresponding to a plurality of segment comments associated with the video includes data corresponding to a particular segment comment, and wherein the data corresponding to the particular segment comment includes an identification of a starting point of a segment of the video associated with the particular segment comment.

6. The method of claim 5, wherein the data corresponding to the particular segment comment includes an identification of a length of the segment comment.

7. The method of claim 5, wherein the data corresponding to the particular segment comment includes an identification of an end point of a segment of the video associated with the particular segment comment.

8. The method of claim 1, wherein the electronic display is part of the electronic device.

9. The method of claim 1, wherein the electronic device is a tablet, slate computer, or smartphone.

10. The method of claim 1, wherein the electronic display is connected to the electronic device.

11. The method of claim 1, wherein the electronic display is a touchscreen display, and wherein at least one of the steps of receiving, at the electronic device from the user, input, comprises receiving input from the user input via the touchscreen display.

12. One or more non-transitory computer readable media containing computer executable instructions for execution by a processor for performing a method comprising:

(a) receiving, at an electronic device,
(i) data corresponding to a video, and
(ii) data corresponding to a plurality of point comments associated with the video, each of the plurality of point comments being associated with a single point in time and with a particular user account of a plurality of user accounts,
(iii) data corresponding to a plurality of segment comments associated with the video, each of the plurality of segment comments being associated with a video segment representing a span of time of the video and with a particular user account of the plurality of user accounts;

(b) displaying, to a user via an electronic display associated with the electronic device, a video annotation interface comprising
(i) a video pane configured to display the video,
(ii) a first video timeline bar including a video playhead indicating a current point of the video which is being played,
(iii) a second segment timeline bar disposed below the first video timeline bar, the second segment timeline bar including initial and final handles configured to define a segment of the video for playing,
(iv) a first plurality of point comment markers identifiable as point comment markers by the presence of a first geometric shape displayed in connection with the video timeline bar, each of the first plurality of comment markers corresponding to one of the plurality of point comments associated with the video,
(v) a second plurality of segment comment markers identifiable as segment comment markers by the presence of a second geometric shape displayed in connection with the video timeline bar, each of the second plurality of comment markers corresponding to one of the plurality of segment comments associated with the video,
(vi) a comment display pane displaying text corresponding to at least some of the plurality of comments associated with the video, and
(vii) a comment control configured to allow the user to add a comment to the video; and (c) receiving, at the electronic device from the user, input corresponding to engagement at a first point on the segment timeline bar;

(d) automatically, in response to receiving the input corresponding to engagement at the first point on the segment timeline bar, moving the initial and final handles of the segment timeline bar to define a first segment of a first length centered around the first point, wherein the first length is one of a preconfigured length and a length determined based on a total length of the video;

(e) receiving, at the electronic device from the user, input corresponding to dragging of the final handle to change the length of the first segment to a second length;

(f) receiving, at the electronic device from the user, input corresponding to dragging of the first segment on the segment timeline bar, and simultaneously moving the initial and final handles while keeping the first segment its current length in response thereto;

(g) receiving, at the electronic device from the user, input corresponding to engagement of the comment control;

(h) in response to receiving input corresponding to engagement of the comment control, displaying, to the user via the electronic display associated with the electronic device, a comment interface;

(i) receiving, at the electronic device from the user, input corresponding to one or more desired annotations; and (j) in response to receiving input corresponding to one or more desired annotations,
(i) associating the input one or more annotations with the selected first segment of the video,
(ii) updating the video annotation interface so that the plurality of comment markers displayed in connection with the video timeline bar includes a new segment comment marker corresponding to the first segment, and
(iii) displaying an indication of the input one or more annotations overlaid over the video in the video pane.

* * * * *